(12) United States Patent
Menache et al.

(10) Patent No.: US 7,009,561 B2
(45) Date of Patent: Mar. 7, 2006

(54) RADIO FREQUENCY MOTION TRACKING SYSTEM AND METHOD

(75) Inventors: Alberto Menache, Los Angeles, CA (US); Mark Alan Sturza, Encino, CA (US)

(73) Assignee: Menache, LLP, Culver City, CA (US)

(*) Notice: Subject to any disclaimer, the term of this patent is extended or adjusted under 35 U.S.C. 154(b) by 0 days.

(21) Appl. No.: 10/777,414

(22) Filed: Feb. 11, 2004

(65) Prior Publication Data

US 2004/0178955 A1    Sep. 16, 2004

Related U.S. Application Data

(63) Continuation-in-part of application No. 10/386,586, filed on Mar. 11, 2003, now Pat. No. 6,831,603.

(60) Provisional application No. 60/523,658, filed on Nov. 7, 2003.

(51) Int. Cl.
    *G01S 3/02*    (2006.01)
    *G03B 19/18*   (2006.01)

(52) U.S. Cl. .............. 342/463; 340/539.13; 340/572.1; 352/53

(58) Field of Classification Search ............... 342/463, 342/465; 340/572.1, 539.13, 825.49, 572.8; 352/53; 345/473
    See application file for complete search history.

(56) References Cited

U.S. PATENT DOCUMENTS

| 1,983,402 | A | * | 12/1934 | Rodman ..................... 352/200 |
| 4,660,039 | A | | 4/1987 | Barricks et al. |
| 4,853,863 | A | | 8/1989 | Cohen et al. |
| 4,945,305 | A | | 7/1990 | Blood |
| 5,056,106 | A | * | 10/1991 | Wang et al. ................. 342/463 |
| 5,138,322 | A | | 8/1992 | Nutall |
| 5,148,179 | A | * | 9/1992 | Allison ................... 342/357.03 |
| 5,216,429 | A | | 6/1993 | Nakagawa et al. |
| 5,317,394 | A | | 5/1994 | Hale et al. |
| 5,363,297 | A | | 11/1994 | Larson et al. |
| 5,438,321 | A | | 8/1995 | Bernard et al. |
| 5,450,070 | A | | 9/1995 | Massar et al. |
| 5,458,123 | A | | 10/1995 | Unger |
| 5,513,854 | A | | 5/1996 | Daver |
| 5,581,257 | A | | 12/1996 | Greene et al. |

(Continued)

FOREIGN PATENT DOCUMENTS

CA    2405048    11/2001

(Continued)

OTHER PUBLICATIONS

A.J. Van Dierendonck, Planned GPS Civil Signals and Their Benefits to the Civil Community, http://www.edu-observatory.org/gps/BostonSection.ppt, p. 38, Oct. 2001.*

(Continued)

*Primary Examiner*—Thomas H. Tarcza
*Assistant Examiner*—Fred H. Mull
(74) *Attorney, Agent, or Firm*—Joel D. Voelzke

(57) ABSTRACT

A radio frequency (RF) motion capture system includes stationary sensor receivers, one or more transmitter marker tags on one or more objects to be tracked within a capture zone, at least one stationary reference tag transmitter, and a processing system for processing the received signals. The individual tags transmit burst of spread-spectrum RF signals. The transmitted signals include a common sync code, and a tag identification code that is unique to each tag. By computing double differences of pseudoranges, clock terms are cancelled out allowing the processing system to precisely determine the location of each tag as it moves through the capture zone without the need to synchronize clocks between sensors and tags. The system can be used for RF match moving.

61 Claims, 14 Drawing Sheets

U.S. PATENT DOCUMENTS

| | | | |
|---|---|---|---|
| 5,583,517 A | 12/1996 | Yokev et al. | |
| 5,589,838 A | 12/1996 | McEwan | |
| 5,600,330 A | 2/1997 | Blood | |
| 5,729,475 A | 3/1998 | Romanik, Jr. | |
| 5,744,953 A | 4/1998 | Hansen | |
| 5,767,669 A | 6/1998 | Hansen et al. | |
| 5,802,220 A | 9/1998 | Black et al. | |
| 5,831,260 A | 11/1998 | Hansen | |
| 5,867,175 A * | 2/1999 | Katzenberger et al. | 345/473 |
| 5,881,321 A * | 3/1999 | Kivolowitz | 352/131 |
| 5,884,239 A | 3/1999 | Romanik, Jr. | |
| 6,005,548 A | 12/1999 | Latpov et al. | |
| 6,050,962 A | 4/2000 | Kramer et al. | |
| 6,070,269 A | 6/2000 | Tardif et al. | |
| 6,095,928 A | 8/2000 | Goszyk | |
| 6,104,379 A | 8/2000 | Petrich et al. | |
| 6,115,052 A | 9/2000 | Freeman et al. | |
| 6,121,926 A * | 9/2000 | Belcher et al. | 342/463 |
| 6,127,672 A | 10/2000 | Danisch | |
| 6,148,280 A | 11/2000 | Kramer | |
| 6,157,592 A | 12/2000 | Kriz et al. | |
| 6,172,499 B1 | 1/2001 | Ashe | |
| 6,176,837 B1 | 1/2001 | Foxlin | |
| 6,181,371 B1 | 1/2001 | Maguire, Jr. | |
| 6,204,813 B1 | 3/2001 | Waddel et al. | |
| 6,269,172 B1 | 7/2001 | Rehg et al. | |
| 6,272,231 B1 | 8/2001 | Maurer et al. | |
| 6,288,785 B1 | 9/2001 | Frantz et al. | |
| 6,316,934 B1 | 11/2001 | Amorai-Moriya et al. | |
| 6,324,296 B1 | 11/2001 | McSheery et al. | |
| 6,359,621 B1 * | 3/2002 | Maeda et al. | 345/473 |
| 6,369,564 B1 | 4/2002 | Khalfin et al. | |
| 6,380,894 B1 | 4/2002 | Boyd et al. | |
| 6,380,933 B1 | 4/2002 | Sharir et al. | |
| 6,400,139 B1 | 6/2002 | Khalfin et al. | |
| 6,409,687 B1 | 6/2002 | Foxlin | |
| 6,428,490 B1 | 8/2002 | Kramer et al. | |
| 6,524,734 B1 * | 2/2003 | Jeon | 429/27 |
| 6,549,004 B1 | 4/2003 | Prigge | |
| 6,563,107 B1 | 5/2003 | Danisch et al. | |
| 6,567,116 B1 | 5/2003 | Aman et al. | |
| 6,580,811 B1 | 6/2003 | Maurer et al. | |
| 6,669,571 B1 * | 12/2003 | Cameron et al. | 473/131 |
| 6,820,980 B1 * | 11/2004 | Romanoff et al. | 352/53 |
| 2001/0033675 A1 | 10/2001 | Maurer et al. | |
| 2002/0097245 A1 | 7/2002 | Jeong et al. | |
| 2002/0135518 A1 * | 9/2002 | Rabinowitz et al. | 342/464 |
| 2002/0145563 A1 | 10/2002 | Kane et al. | |
| 2002/0145565 A1 * | 10/2002 | Rabinowitz et al. | 342/464 |
| 2002/0183071 A1 * | 12/2002 | Shioda et al. | 455/457 |
| 2003/0002033 A1 | 1/2003 | Boman | |
| 2003/0045816 A1 | 3/2003 | Foxlin | |
| 2003/0079218 A1 | 4/2003 | Goldberg | |
| 2003/0083596 A1 | 5/2003 | Kramer et al. | |
| 2003/0095186 A1 * | 5/2003 | Aman et al. | 348/162 |
| 2003/0095708 A1 | 5/2003 | Pittel | |
| 2003/0120425 A1 | 6/2003 | Stanley et al. | |
| 2003/0122711 A1 * | 7/2003 | Panasik et al. | 342/464 |

FOREIGN PATENT DOCUMENTS

| | | |
|---|---|---|
| JP | 10-742049 | 3/1998 |
| JP | 10-222668 | 8/1998 |
| JP | 10-261090 | 9/1998 |
| JP | 2000-146509 | 5/2000 |
| JP | 2000-231638 | 8/2000 |
| JP | 2001-2154058 | 8/2001 |
| JP | 2001-2655021 | 9/2001 |
| WO | WO 98/41815 | 9/1998 |
| WO | WO 98/47426 | 10/1998 |
| WO | WO 99/53443 | 10/1999 |
| WO | WO 01/09861 | 2/2001 |
| WO | WO 01/35208 | 5/2001 |
| WO | WO 01/81859 A1 | 11/2001 |
| WO | WO 02/25306 | 3/2002 |

OTHER PUBLICATIONS

J.L. Weston et al., Modern inertial navigation technology and its application, Electronics & Communication Engineering Journa vol. 12(2), p. 49-64, Apr. 2000.*

A. Fenster et al., "3-D Ultrasound Imagine: A Review", IEEE Engineering in Medicine and Biology Magazine, IEEE Inc., New York, vol. 15, No. 6, Nov. 1996, pp. 41-51.

D. J. Sturman, "Computer Puppetry," IEEE Computer Graphics and Applications, IEEE Inc., New York, vol. 18, No. 1, Jan. 1998, pp. 38-45.

Invitation to Pay Additional Fees, in corresponding PCT Appl. No. PCT/US04/007375 (citing various references as relevant to claim which correspond to the following claims in the present application: claims 1-8, 19, 24-32, 35, 36, 54-69).

Reynolds Matthew; "A Phase Measurement Radio Positioning System for Indoor Use"; MIT; Feb. 3, 1999.

Lancaster, Don; "Tech Musings"; No. 135; Apr. 1999.

Hightower, Jeffrey, et al; "SpotON" An Indoor 3D Location Sensing Technology Based on RF Signal Strenth; UW CSE Technical Report #Feb. 2, 2000; Feb. 18, 2000.

Hightower, Jeffrey and Gaetano Borriello; "Location Systems for Ubiquitous Computing"; IEEE Computer Magazine; Aug. 2001.

Foxlin, Eric; "Motion Tracking Requirements and Technologies"; Extended draft versino of Chapter 8 in Handbood of Virtual Environment Technology; Kay Stanney, Ed.; Lawrence Erlbaum Associates; 2002.

Kitasuka, Terukai, et al.; "Location Estimation System Using Wireless Ad-Hoc Network"; 2002.

Trakus, Inc.; Various pages from http://www.trakus.com; displaying "Copyright 2002" and printed on Dec. 16, 2003.

Menache, Alberto, "Understanding Motion Capture for Computer Animation and Video Games" Academic Press 2000 (pp. vii-ix, xiii-xiv, 1-2, 14-37, 205-206).

J. Hightower et al., "Design and Calibration of the SpotOn AD-HOC Location Sensing System".

* cited by examiner

A 5.730-5.740 GHz
B 5.745-5.755 GHz
C 5.760-5.770 GHz
D 5.775-5.785 GHz
E 5.790-5.800 GHz
F 5.805-5.815 GHz
G 5.200-5.830 GHz
H 5.835-5.845 GHz

FIG. 18
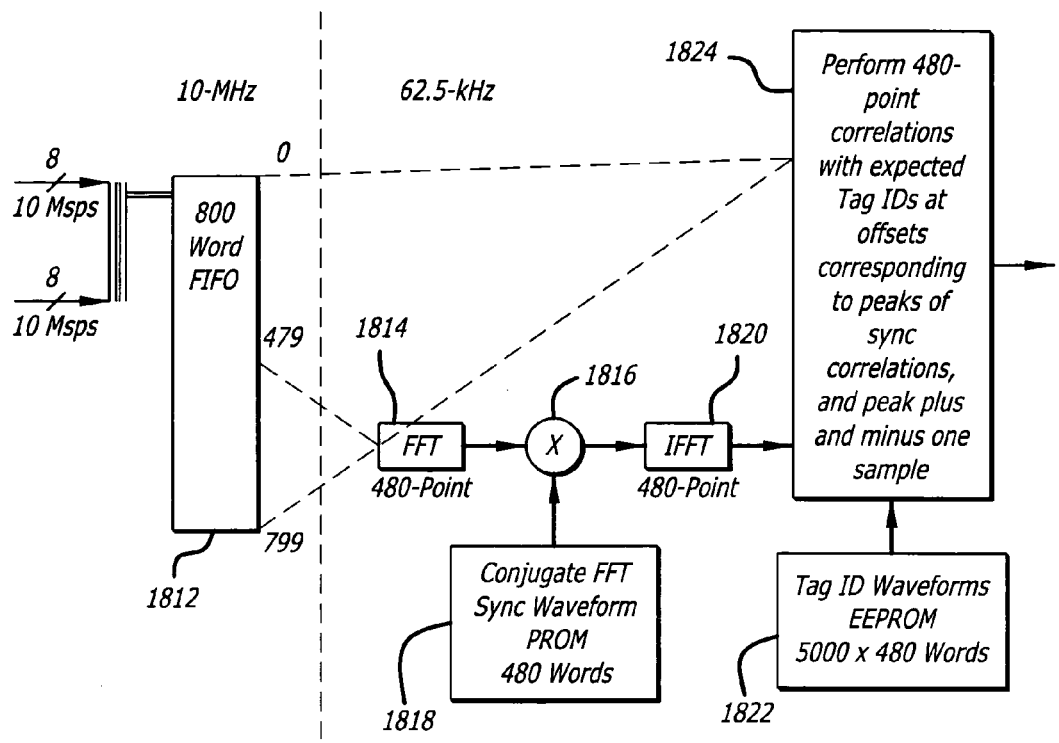
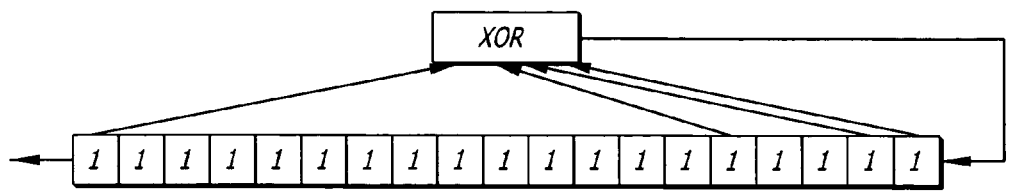
FIG. 19

RADIO FREQUENCY MOTION TRACKING SYSTEM AND METHOD

CROSS-REFERENCE TO RELATED APPLICATIONS

This application is a continuation-in-part of U.S. application Ser. No. 10/386,586, filed Mar. 11, 2003, now U.S. Pat. No. 6,831,603. This application also claims priority from U.S. Provisional Application Ser. No. 60/523,658 filed Nov. 7, 2003.

BACKGROUND OF THE INVENTION

1. Field of the Invention

Optical motion capture systems generally employ reflective patches adhered or sewn to an actor's clothing, and a light shining on the actor. Optical cameras record the reflections from the patches, and a processing system processes the images recorded by the cameras to determine the positions of the patches as the actor moves through a scene. Examples of optical motion capture systems include U.S. Pat. Nos. 6,580,811 entitled Wavelet-Based Facial Motion Capture for Avatar Animation, and U.S. Pat. No. 6,567,116 entitled Multiple Object Tracking System. The former patent incorporates wavelet transforms for feature detection and tracking. Optical motion tracking systems are limited to line-of-sight operation. Once a particular patch has been hidden from view by an actor s movement and the patch then reemerges into view, an operator must generally identify for the system by hand the reappeared patch.

2. Description of Related Art

The term motion capture or motion tracking refers to tracking one or more objects or positions on an object or objects, and quantizing and recording the objects' positions as they move through space. The space can be 1-dimensional, 2-dimensional, or more commonly, 3-dimensional space. In many applications such as gait analysis a number of points on the object are to be tracked so as to effectively track, quantize, and record the linear and rotational movements of the component parts of the object such as the joints and limbs. Motion capture allows a live performance to be translated into a digital performance. Motion capture is becoming increasingly important in the entertainment industry, in which it is desirable to track many points on a person such as a stunt person and any objects which the actor may be carrying or are otherwise associated with the actor. Once the movements of the person's limbs and any associated objects have been digitally captured, the movement data can be used to digitally superimpose the person into a different environment, or to digitally recreate a different character such as a different actor or a creature performing those same or similar movements. The resulting digitally created images can be used in motion pictures, video games, virtual reality systems, and similar applications. In sports, precisely tracking movements of body parts and appendages can be used, for example, to analyze and correct a person's golf swing.

A number of prior art motion tracking techniques exist. The principal technologies previously used for motion capture are optical, electromagnetic, and electromechanical systems. Several RF systems have also been proposed or are in use. Systems based on the Global Position System (GPS) and its array of satellites can also be used to track the positions of objects on the earth such as cargo containers, although GPS based systems are relatively slow, inaccurate, bulky, and expensive for the types of applications for which motion capture systems are typically used.

Optical Motion Capture Systems

Optical motion capture systems generally employ reflective patches adhered or sewn to an actor's clothing, and a light shining on the actor. Optical cameras record the reflections from the patches, and a processing system processes the images recorded by the cameras to determine the positions of the patches as the actor moves through a scene. Examples of optical motion capture systems include U.S. Pat. No. 6,580,511 entitled Wavelet-Based Facial Motion Capture for Avatar Animation, and U.S. Pat. No. 6,567,116 entitled Multiple Object Tracking System. The former patent incorporates wavelet transforms for feature detection and tracking. Optical motion tracking systems are limited to line-of-sight operation. Once a particular patch has been hidden from view by an actor's movement and the patch then reemerges into view, an operator must generally identify for the system by hand the reappeared patch.

Electromagnetic Trackers

Electromagnetic trackers generally work on the principle that a tag creates an electromagnetic field around it, or induces disturbances in an electromagnetic field which has been induced across the capture zone. Examples of Magnetic Field motion capture systems include U.S. Pat. No. 6,549,004 entitled Distributed Magnetic Field Positioning System Using Code Division Multiple Access, and U.S. Pat. No. 6,400,139 entitled Methods and Apparatus for Electromagnetic Position and Orientation Tracking with Distortion Compensation. The former patent uses code division multiple access (CDMA) to distinguish between beacons, purportedly allowing for larger capture zones and reduced interference.

Electromechanical Devices and Suits

Electromechanical devices and suits generally employ electromechanical sensors such as potentiometers to capture movements such as rotations of joints. The sensors can be connected by wires to the processing system, or the output of the sensors can be transmitted via a wireless connection. Electromechanical suits have been widely used in virtual reality simulation systems. Examples of electromechanical motion tracking systems include U.S. Pat. No. 6,563,107 entitled Topological and Motion Measuring Tool, and U.S. Pat. No. 6,070,269 entitled Data-Suit for Real-Time Computer Animation and Virtual Reality Applications. Electromechanical systems are often bulky and obtrusive, and are not well suited for tracking the relative movement of independent objects.

Radio Frequency Systems

Several radio frequency (RF) systems have also been proposed. U.S. Pat. No. 6,204,813 purports to describe a radio frequency positioning system that determines identity and positional data of numerous objects. The system includes a plurality of spread-spectrum radio transceivers where at least one transceiver is positioned on each of the numerous objects. At least three spread-spectrum radio transceivers transmit to and receive signals from the plurality of radio transceivers. A signal processor is coupled to the spread-spectrum radio transceivers and determines the identity and the positional data of the objects.

U.S. Pat. No. 5,583,517 is directed to a multi-path resistant frequency-hopped spread-spectrum mobile location system. The frequency-hopped spread-spectrum mobile vehicle or person location system consists of a central station, a plurality of base stations and a plurality of mobile transmitters which transmit using a frequency-hopped spread-spectrum differential bi-phase shift keying (BPSK) communication signal. Each of the plurality of base stations includes an array of receiving dipole antennas and employs a special algorithm for retrieving very low power frequency-hopped spread-spectrum signals in a noisy and multi-path environment. The base stations use computational algorithms for determining the phase difference between each of the receiving dipole antennas to determine the direction of the transmitter relative to the location of the respective base station. The multiple directions of arrival angles of the received signal at each base station are corrected based on an n-dimensional ambiguity space to locate the most probable angles of arrival.

U.S. Pat. No. 5,513,854 describes a system in which each player on a field carries a miniaturized radio frequency transmitter. A set of at least three radio frequency goniometric receivers determines the direction from which the transmitters transmit. A digital processor uses triangulation methods to determine the position of the transmitters.

U.S. Pat. No. 5,438,321 describes a location system for tracking miners underground. The system includes a number of identification stations connected to a central control station. Miners are issued portable identification modules which are fitted to their caplamps. The identification modules transmit unique identification signals at intervals, which are picked up by the identification stations. Miners who are issued a caplamp first pass an identification card through a reader which reads a unique personal identification code from the card. The system includes a direction finding receiver adapted to receive and display the identification code transmitted by the identification module of a lost miner.

U.S. Pat. No. 5,056,106 describes a system which employs a spread-spectrum based radiolocation system, using hand-held receiver units and fixed-position reference transmitters, to determine distance and direction between a golfer and key locations on a golf course. The plurality of timing reference transmitters which are located throughout the vicinity of the golf course broadcast a spread-spectrum ranging signal consisting of a radio-frequency carrier directly modulated by a periodic pseudo-noise (PN) coded or similar sequence. Each transmitter broadcasts at the same RF signal but a unique PN-coded sequence is assigned to each transmitter. Golfers are provided with the hand-held receiving unit which receives the transmitter spread-spectrum signals and which synchronizes to the spread-spectrum signals in order to obtain range estimates to a selected set of reference transmitters.

U.S. Pat. No. 4,660,039 describes a system for locating a sport object. The user carries a radiofrequency transmitter, and the sport object has a conductive stripe which has an effective length of $\lambda/4$ at the signal frequency so that the conductive stripe increases the load on the transmitter as the transmitter moves closer to the sport object.

INVENTION SUMMARY

The present invention provides an improved RF motion tracking system that provides various advantages over prior art systems. In one aspect the invention is of a motion capture system. According to this first aspect, in a preferred embodiment the invention includes preferably at least four stationary radio frequency receivers defining sensors that are placed at known locations around or about an area to define a capture zone, at least one stationary radio frequency transmitter defining a reference tag, and a number of radio frequency transmitters defining marker tags that are placed onto one or more objects to be tracked. A processing system processes the signals received by the sensors. The signals are spread-spectrum RF signals. The positions of the reference tag relative to the sensors can be determined using direct measurements or can be determined using various possible calibration procedures and techniques which do not rely upon direct measurements. The capture zone should be at least within the reception range of all of the receivers.

Once the position of the reference tag is determined relative to the sensors, digital samples from the sensors are processed to extract a pseudorange measurement between each tag and each sensor. The measurements are pseudoranges, as opposed to ranges, because they contain a time term as well as a distance term. These measurements are differenced between the marker tags and the reference tag, and the resulting single differences are differenced between sensors to form double differences. The double differences are processed to determine the marker tag positions at each measurement time relative to the reference tag position. Equivalently, the position of each of the marker tags can be determined relative to a locus within any frame of reference including each other, the sensors positions, or any arbitrary coordinate system, using known mathematical coordinate transformations. Because the algorithms used to process the signals from the reference tag and marker tags cause the clock-dependent terms to drop out, the positions of the marker tags can be determined to a very high degree of accuracy without requiring clocks to be synchronized between sensors, between tags, or between sensors and tags.

The signals transmitted by the tags are code sequences modulated on a carrier frequency and spread using direct-sequence spread-spectrum techniques. The code sequences include a synchronization code, which is common to all tags, and a tag identification code, which is unique to each tag. In a preferred embodiment the synchronization code is the 16-bit Neuman-Hofman sync word OEED hex having good autocorrelation characteristics. The tag identification codes are chosen to minimize pairwise cross-correlation. Those codes are randomly chosen vectors in the binary extended quadratic residue code space. The processing system uses code phase and carrier phase determinations to resolve the positions of the tags to within a fraction of a wavelength. The transmitters transmit microbursts of code such that the transmitters are transmitting less than 5% of the time, less than 1% of the time, and in the exemplary embodiment approximately 0.2% of the time. This small duty cycle minimizes battery drain at the transmitters and reduces the likelihood of collisions. The transmission rate is preferably an integer multiple of both 24 per second and 30 per second, and more preferably 240 per second. This ensures that motion can be captured at a frame rate that is equal to either 24 frames per second or 30 frames per second, which are standard frame rates used within the entertainment industry.

In the processing system, the received waveform representing the tag identification codes is not demodulated to a bit stream of ones and zeroes with the binary code value then looked up via a look up table. Rather, the digital samples representing the received tag identification code waveform are processed through a correlator implemented within a Digital Signal Processor (DSP). The tag identification code is determined by autocorrelating candidate tag code waveforms to the received waveform.

Simulations indicate that the system will be able to track up to five thousand tags within a capture zone of up to 125 meters diagonal, with sub-millimeter accuracy. More generally, this means that the system will be able to resolve positions of at least 100 tags to within 1 cm of accuracy over a capture zone having a diagonal of at least 50 meters. This also means that the system will be able to resolve positions of at least 1000 transmitters to less than 1 cm of accuracy over a capture zone of at least 75 meters.

In another aspect, the invention is of a flexible RF patch tag that, when a protective cover or layer is removed, automatically turns itself on and begins transmitting. Visual, audio, or other feedback can be provided to verify that the tag is active and transmitting. In one embodiment the patch transmitter is a small round flexible patch having several thin layers, including a backing layer, an adhesive coating, a battery layer, a circuitry layer, an antenna layer, and a protective layer. The device may be covered by a paper or film layer covering the adhesive layer, with removal of the paper layer causing electrical power contacts to close thus activating the device. At the same time, removal of the paper layer causes the adhesive to be exposed so that the tag can be adhered directly to the object to be tracked. The patch tag is small enough to be adhered to a large number of positions on human skin or clothing while allowing substantially full movement of the person.

The motion capture system of the present invention can be utilized in any application in which it is desirable to know the positions of objects within a reference frame, and particularly in applications in which it is desirable to know the positions of many quickly moving points on an object or many separate objects.

In another aspect, the invention is of a match moving system which utilizes the RF motion capture system described to track movements of a motion picture camera and perform post-processing on the recorded moving picture image in accordance with the tracked position and attitude of the camera. In this aspect of the invention, at least three marker tags are placed on a motion picture camera such as a hand held motion picture camera. The marker tags are placed in non-planar positions on the camera such that the locations of the three tags completely determines the camera's spatial position as well as its pitch, yaw, and roll angles. The camera records a scene while the camera is moving, such as by being hand carried by the camera operator. Because the exact position and attitude of the camera is precisely recorded by the RF motion tracking system, the resulting image can later be post-processed to achieve a number of desirable effects.

In one example, the recorded scene can be post-processed to insert a digital computer generated image (CG) image into the scene. As the camera pans horizontally or vertically around the scene, moves forward or backwards, rotates, pitches, or performs any other motion, the CG image can be altered to match the motion of the camera. The appearance of the CG image changes exactly as one would expect an image of an object physically present in the scene to change as the camera moves. The result is a realistic CG image within a motion picture while substantially reducing manual correlating and manipulating of the CG image as was required in certain prior art systems. In another example, the match moving system allows the recorded image to be post-processed to remove camera jitter, that is, to remove from the recorded image the effects of small motions of the camera so that to the viewer the camera appears to have been held steady, although possibly moving, throughout the filming of the scene.

Although the system can theoretically be combined with other position determining techniques such as GPS, inertial sensors, and electromechanical sensors for use in some applications, for most intended applications the system will operate without any other positioning determining methods.

Exemplary embodiments of the invention will be further described below with reference to the drawings, in which like numbers refer to like parts.

BRIEF DESCRIPTION OF THE DRAWINGS

FIG. 18 is a functional block diagram of a correlation bank implemented within the processor.

FIG. 19 is a simple shift register generator used to generate tag transmissions according to a second system embodiment.

DETAILED DESCRIPTION OF THE PREFERRED EMBODIMENTS

Figure 1:
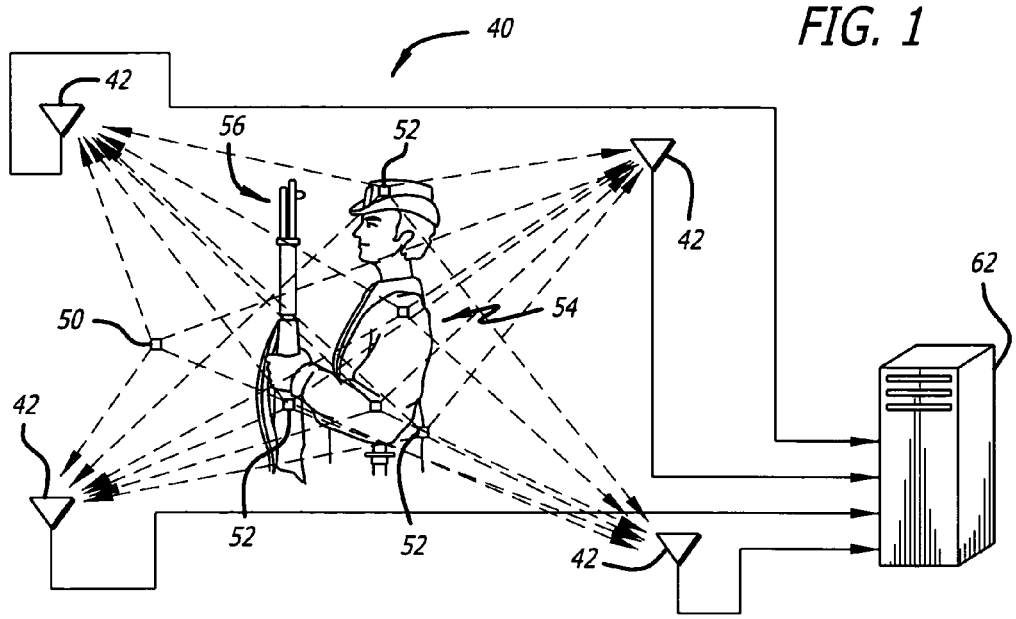
FIG. 1 is a generalized system diagram of the motion capture system of the present invention.

With reference to FIG. 1, a radio frequency (RF) position tracking system 40 according to a first aspect of the present invention consists of three subsystems: active RF tags or simply tags, passive sensors 42, and processing equipment or simply the processor 60. The system 40 employs two different types of tags: one or more reference tags 50 and one or more marker tags 52. Reference tag 50 and marker tags 52 can be identical in construction. They differ primarily in their placement and use. In a preferred embodiment, a plurality of marker tags 52 are placed on an object 54 to be tracked such as the person illustrated in the figure, as well as any appendages 56 such as a gun or a sword being carried by the person. For an object having a large number of constituent parts and possible movements such as a human being, preferably a large number of marker tags 52 are placed on the person's respective limbs and joints such that tracking movements of the individual marker tags 52 results in a complete or nearly complete record of the object's various movements. Multiple objects can be tagged and tracked. For example, two humans engaged in a sword fight can be tracked, with the resulting digital performance stored and later transformed into a sword fight between two alien creatures. The object(s) and the reference tag are placed within a motion capture zone or simply capture zone, within an area bounded by sensors 42. The capture zone generally lies within, but does not necessarily completely occupy, the area bounded by sensors 42, as there may be a buffer area between the capture zone and sensors 42. Marker tags 52 and reference tag 50 transmit RF signals, preferably direct-sequence spread-spectrum signals. The signal sensors 42 are receivers that receive the RF signals transmitted by the tags.

The signal from each marker tag 52 and reference tag 50 is uniquely encoded to distinguish between the individual tags. A minimum of four sensors 42 are placed around the periphery of the capture zone. Sensors 42 digitize (sample and quantize) the received signal band. Digital samples from sensors 42 are processed to extract a pseudorange measurement between each tag 50 or 52 and each sensor 42. The measurements are pseudorange, as opposed to range, because they contain a time term. These pseudorange measurements are differenced between the marker tags 52 and the reference tag 50, and the resulting single differences are differenced between sensors to form double differences. The double differences are processed to determine the marker tag 52 positions at each measurement time relative to the reference tag 50 position. This raw position information is output for each marker tag 52.

Figure 2:
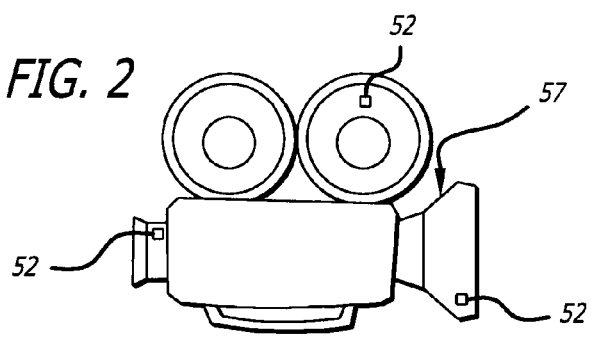
FIG. 2 is a diagram illustrating how the present invention can be used with a motion picture camera as part of a match moving system.

FIG. 2 illustrates one specialized application for the invention in which the object to be tracked is a motion picture camera 57. Camera 57 has a plurality of marker tags 52 affixed thereto or otherwise associated therewith. Preferably camera 57 has at least three marker tags affixed thereto in a non-linear and non-planar spatial relationship so that movements of the camera can be completely captured including the x,y,z position of at least one point on the camera as well as its pitch, roll, and yaw. In this application the system is used as part of a match moving system. The match moving system can be used for generation of computer generated objects or for removal of camera jitter.

Processing Algorithms

In the discussion which follows, the designator A will refer to an arbitrary marker tag 52, the designator R will refer to a reference tag 50, and the designator i will refer to an arbitrary sensor 42, for convenience of mathematical development without reference to any particular figure herein.

The double difference measurements are formed using pseudorange measurements from marker tag, A, and from reference tag, R, to each of the sensors. At the n-th measurement time, reference tag R is located at (0,0,0) with clock $T^R(n)$, and Marker Tag A is located at $r^A(n) = [r^A_X(n), r^A_Y(n), r^A_Z(n)]^T$ with clock $T^A(n)$. Multiple sensors receive the RF signals from A a R. Sensor i is located at known position $s_i = [s_{iX}, s_{iY}, s_{iZ}]^T$ and is stationary with clock $T_i$(n the measurement equations for the marker A and reference tag R pseudoranges (PRs) at sensor i are given by $$PR_i^A(n) = \sqrt{(r_X^A(n) - s_{iX})^2 + (r_Y^A(n) - s_{iY})^2 + (r_Z^A(n) - s_{iZ})^2} - c(T^A(n) - T_i(n))$$

$$= |r^A(n) - s_i| - c(T^A(n) - T_i(n))$$

$$PR_i^R(n) = \sqrt{s_{iX}^2 + s_{iY}^2 + s_{iZ}^2} - c(T^R(n) - T_i(n))$$

$$= |s_i| - c(T^R(n) - T_i(n))$$

where $$|r^A| = \sqrt{r_X^{A\,2} + r_Y^{A\,2} + r_Z^{A\,2}}$$

where

Single differences between the marker tag A and reference tag R pseudorange measurements eliminates the sensor clock term $$PR_i^A(n) - PR_i^R(n) = |r^A(n) - s_i| - |s_i| - c(T^A(n) - T^R(n))$$

Double differences between sensors i's and j's single differences eliminates tag related clocks terms $$\delta PR_{ij}^{AR}(n) = PR_i^A(n) - PR_i^R(n) - PR_j^A(n) + PR_j^R(n) = |r^A(n) - s_i| - |r^A(n) - s_j| - |s_i| + |s_j|$$

Combining the terms independent of the marker tag A position on the left side gives:

$$\delta PR_{ij}^{AR}(n) + |s_i| - |s_j| = |r^A(n) - s_i| - |r^A(n) - s_j|$$

The three unknowns are the marker tag, A, position coordinates, $r^A_X(n)$, $r^A_Y(n)$, and $r^A_Z(n)$, at time n. Measurements from four sensors 42 are required to form the three independent double differences required to obtain three independent equations in these three unknowns. The resulting equations can be solved directly for the marker tag A coordinates. Alternatively, the equations can be linearized around an approximate solution and the resulting linear equations solved for the marker tag A coordinates. The direct solution can also be used as the approximate solution for linearization.

Given single difference measurements from four sensors, the direct solution can be calculated as follows, where $s_0$, $s_1$, $s_2$, and $s_3$ are the position vectors for the four sensors relative to the reference tag R; and $\delta PR_{01}^{AR}$, $\delta PR_{02}^{AR}$, and $\delta PR_{03}^{AR}$ are the three scalar double differences.

$\beta_k = \delta PR_{0k}^{AR} + |s_0| - |s_k|$, $k = 1, 2, 3$ {reorder if necessary such that $\beta_1 \neq 0$, further, if $\beta_k = -|p_k|$ for any $k$, reorder such that $\beta_1 = -|p_1|$}

$p_k = s_k - s_0$, $k = 1, 2, 3$ $n_1 = \beta_2 p_1 - \beta_1 p_2$ $n_2 = \beta_3 p_1 - \beta_1 p_3$ $\alpha_1 = \beta_1\beta_2(\beta_2-\beta_1) + \beta_1 p_2 \cdot (p_1-p_2)$ $\alpha_2 = \beta_3(\beta_3-\beta_1) + \beta_1 p_3 \cdot (p_1-p_3)$ $Y = p_1 p_1^T - \beta_1^2 I_3$ {$I_3$ is the 3×3 identity matrix}

$\phi = \beta_1^2(|p_1|^2 - \beta_1^2)$ $n = n_1 \times n_2$ {vector cross-product, $|n| > 0$ for non-planar satellite geometry}

$\lambda 1 = \alpha_1 |n_2|^2 - \alpha_2 n_1 \cdot n_2)/|n|^2$ $\lambda_2 = \alpha_2 |n_2|^2 - \alpha_1 n_1 \cdot n_2)/|n|^2$ $q = \lambda_1 n_1 + \lambda_2 n_2$ $\sigma = n^T Y n$ $\omega = (r^T Y r - \phi)/\sigma$ $\kappa = n^T Y r / \sigma$ $\theta = -\kappa \pm [\kappa^2 - \omega]^{1/2}$ $w = \theta n + q$, check $\beta^1(p_1 \cdot w) \leq 0$ $r^A = \frac{1}{2}[w + s_1 - s_0]$ {position vector of tag $A$ relative to reference tag $R$}

For (M+1) sensors, $M \geq 3$, the generalized least squares solution for marker tag A position relative to the reference tag is given by:

$r^A(n) = r^0(n) + \delta r^A$ where $r^0(n)$ is an approximate solution for the marker tag A position vector $\delta r^A = (H_n^T H_n)^{-1} H_n^T \delta z$ $$\delta z = \begin{bmatrix} \delta PR_{0,1}^{AR}(n) - |r^0(n) - s_0| + |r^0(n) - s_1| + |s_0| - |s_1| \\ \delta PR_{1,2}^{AR}(n) - |r^0(n) - s_1| + |r^0(n) - s_2| + |s_1| - |s_2| \\ \vdots \\ \delta PR_{M,M+1}^{AR}(n) - |r^0(n) - s_M| + |r^0(n) - s_{M+1}| + |s_M| - |s_{M+1}| \end{bmatrix}$$

$M \times 1$ measurement vector $$H_n = \begin{bmatrix} \alpha x_{0,1}^A(n) & \alpha y_{0,1}^A(n) & \alpha z_{0,1}^A(n) \\ \alpha x_{1,2}^A(n) & \alpha y_{1,2}^A(n) & \alpha z_{1,2}^A(n) \\ \vdots & \vdots & \vdots \\ \alpha x_{M,M+1}^A(n) & \alpha y_{M,M+1}^A(n) & \alpha z_{M,M+1}^A(n) \end{bmatrix}$$

{$M \times 3$ observation matrix}

$\alpha x_{ij}^A(n) = \dfrac{r_X^0(n) - s_{iX}}{|r^0(n) - s_i|} - \dfrac{r_X^0(n) - s_{jX}}{|r^0(n) - s_j|}$ $\alpha y_{ij}^A(n) = \dfrac{r_Y^0(n) - s_{iY}}{|r^0(n) - s_i|} - \dfrac{r_Y^0(n) - s_{jY}}{|r^0(n) - s_j|}$ $\alpha z_{ij}^A(n) = \dfrac{r_Z^0(n) - s_{iZ}}{|r^0(n) - s_i|} - \dfrac{r_Z^0(n) - s_{jZ}}{|r^0(n) - s_j|}$ For improved accuracy, these equations can be iterated as follows:

1. Given initial marker A estimated position vector, $r^0(n)$, sensor location vectors, $s_i$'s, and double differences, compute $\delta PR_{ij}^{AR}$'s.
2. Compute the measurement vector, $\delta z$.
3. Compute the linearized observation matrix, $H_n$.
4. Compute the error state vector, $\delta r$.
5. Update the marker tag A estimated position vector $r^A(n)$.
6. Repeat from step 2, using the updated position vector as the new estimated position vector, until the computed error state vector is sufficiently small.

The covariance of the error state estimate is given by $E[\delta r \delta r^T] = (H_n^T H_n)^{-1} H_n^T E[\delta z \delta z^T] H_n (H_n^T H_n)^{-T}$ Assuming that the individual pseudorange measurement errors are i.i.d. (independently identically distributed) with variance $\sigma_M^2$, then the error covariance matrix is given by:

$E[\delta r \delta r^T] = 4(H_n^T H_n)^{-1} H_n^T G H_n (H_n^T H_n)^{-T} \sigma_M^2$ where $$G = \begin{bmatrix} 1 & -\frac{1}{2} & 0 \\ -\frac{1}{2} & 1 & -\frac{1}{2} \\ 0 & -\frac{1}{2} & 1 \end{bmatrix}$$

Figure 4:
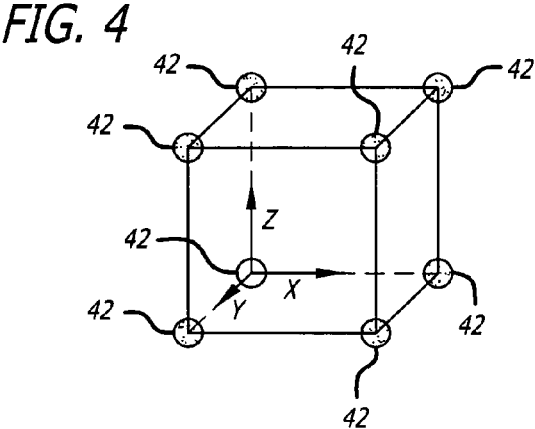
FIG. 4 illustrates placement of sensors in an exemplary 8-sensor embodiment.
Figure 3:
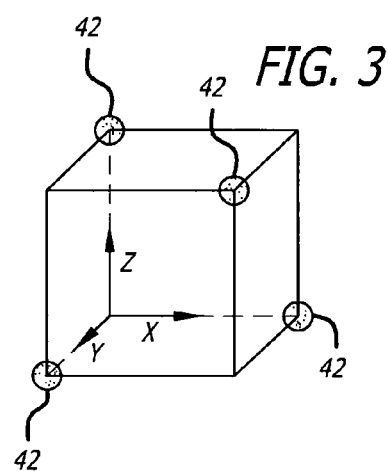
FIG. 3 illustrates placement of sensors in an exemplary 4-sensor embodiment.

The effect of the sensor-tag geometry is position dilution of precision, PDOP, which is computed as $PDOP = \{\text{trace}[(H_n^T H_n)^{-1} H_n^T G H_n (H_n^T H_n)^{-T}]\}^{1/2}$ PDOP can be decomposed into vertical and horizontal components $PDOP^2 = HDOP^2 + VDOP^2$ Preferably the system uses at least 4 sensors 42, as illustrated in one exemplary 4-sensor arrangement in FIG. 3. More sensors, such as in the exemplary 8-sensor arrangement shown in FIG. 4 are possible. Generally speaking, the greater the number of sensors 42 the lower the PDOP. The number of sensors and tags used in order to obtain greater precision, however, must be balanced against practical considerations including processing power and throughput.

When pseudorange measurements from 5 or more sensors are available, it is possible to detect when the 4 independent double differences are inconsistent. With pseudorange measurements from 6 or more sensors, it is possible to identify 1 erroneous double difference measurement. In general, with (M+1) sensors it is possible to identify up to (M−4) erroneous measurements. Erroneous measurements can arise as the result of multipath, variations in the radio refractive index, interference, and equipment errors. The M×1 fault vector, f, is computed as:

$S = I_M - H_n(H_n^T H_n)^{-1} H_n^T$ $f = Sz$

If the decision variable $f^T f$ exceeds a threshold, then the M double difference measurements are not consistent. If M is greater than or equal to 5, then (M−4) faulty measurement(s) can be identified by finding the index(s), i, that maximize $f_i^2 / S_{ii}$.

The threshold, T, for (M+1) Sensors is computed as $$T = 4\sigma_M^2 Q^{-1}(P_{FA}|M-3)$$

where $\sigma_M^2$ is the pseudorange measurement variance
$P_{FA}$ is the acceptable false alarm rate
$Q^{-1}(x,n)$ is the inverse of $$Q(x, n) = 1 - [2^{n/2}\Gamma(n/2)]^{-1} \int_0^X t^{n/2-1} e^{-t/2} dt$$

The probability of missed detection is calculated using $$P_{MD} = \frac{1}{M} \sum_{i=1}^{M} P\left(\frac{T}{4\sigma_M^2} \middle| M-3, \frac{B^2}{4\sigma_M^2} S_{ii}\right)$$

where $$P(x|n, \theta) = \sum_{j=0}^{\infty} e^{-\theta/2} \frac{(\theta/2)^j}{j!} P(x|n+2j)$$

B is the acceptable measurement error.

An alternate algorithm for processing the double differences to determine the marker tag positions relative to the reference tag is the extended Kalman filter. The marker tag motion is modeled as driven by white noise acceleration, the system model is:

$$x(k) = \Phi x(k-1) + w(k)$$

where $x(k) = [r(k)^T \ v(k)^T \ a(k)^T]^T$ {9×1 state vector}
$r(k)$ is the Marker Tag position vector
$v(k)$ is the Marker Tag velocity vector
$a(k)$ is the Marker Tag acceleration vector $$\Phi = \begin{bmatrix} 1 & 0 & 0 & \Delta T & 0 & 0 & \Delta T^2/2 & 0 & 0 \\ 0 & 1 & 0 & 0 & \Delta T & 0 & 0 & \Delta T^2/2 & 0 \\ 0 & 0 & 1 & 0 & 0 & \Delta T & 0 & 0 & \Delta T^2/2 \\ 0 & 0 & 0 & 1 & 0 & 0 & \Delta T & 0 & 0 \\ 0 & 0 & 0 & 0 & 1 & 0 & 0 & \Delta T & 0 \\ 0 & 0 & 0 & 0 & 0 & 1 & 0 & 0 & \Delta T \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{bmatrix}$$

{9×9 state transition matrix}

$\Delta T$ is interval between measurements k and k+1 (nominally 0.004167 sec).

$E[w(k)] = 0$ $Q = E[w(k)w(k)^T]$ $$= \sigma_A^2 \begin{bmatrix} 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 0 & 0 & 0 \\ 0 & 0 & 0 & 0 & 0 & 0 & 1 & 0 & 0 \\ 0 & 0 & 0 & 0 & 0 & 0 & 0 & 1 & 0 \\ 0 & 0 & 0 & 0 & 0 & 0 & 0 & 0 & 1 \end{bmatrix}$$

{9×9 state noise covariance matrix}

$\sigma_A$ is the modeled acceleration noise standard deviation (nominally 2.25 m/sec$^2$)

The measurement model is $$\delta z(k) = H(k)\delta x(k) + v(k)$$

where $$\delta z(k) = \begin{bmatrix} \delta PR_{0,1}^{AR}(k) - |r(k) - s_0| + |r(k) - s_1| + |s_0| - |s_1| \\ \delta PR_{1,2}^{AR}(k) - |r(k) - s_1| + |r(k) - s_2| + |s_1| - |s_2| \\ \vdots \\ \delta PR_{M,M+1}^{AR}(k) - |r(k) - s_M| + |r(k) - s_{M+1}| + |s_M| - |s_{M+1}| \end{bmatrix}$$

{M×1 measurement vector}

$$H_k = \begin{bmatrix} \alpha x_{0,1}^A(k) & \alpha y_{0,1}^A(k) & \alpha z_{0,1}^A(k) & 0 & 0 & 0 & 0 & 0 & 0 \\ \alpha x_{1,2}^A(k) & \alpha y_{1,2}^A(k) & \alpha z_{1,2}^A(k) & 0 & 0 & 0 & 0 & 0 & 0 \\ \vdots & \vdots & \vdots & \vdots & \vdots & \vdots & \vdots & \vdots & \vdots \\ \alpha x_{M,M+1}^A(k) & \alpha y_{M,M+1}^A(k) & \alpha z_{M,M+1}^A(k) & 0 & 0 & 0 & 0 & 0 & 0 \end{bmatrix}$$

{M×9 observation matrix}

$E[v(k)] = 0$ $R = E[v(k)v(k)^T]$ $$= 4\sigma_{PR}^2 \begin{bmatrix} 1 & -\frac{1}{2} & 0 & \cdots & 0 & 0 \\ -\frac{1}{2} & 1 & -\frac{1}{2} & \cdots & 0 & 0 \\ 0 & -\frac{1}{2} & 1 & \cdots & 0 & 0 \\ \vdots & \vdots & \vdots & & \vdots & \vdots \\ 0 & 0 & 0 & \cdots & 1 & -\frac{1}{2} \\ 0 & 0 & 0 & \cdots & -\frac{1}{2} & 1 \end{bmatrix}$$

{M×M measurement noise covariance matrix}

$\sigma_{PR}$ is the pseudo-range standard deviation (nominally 3.5 m for code phase based measurements, and 0.00025 m for carrier phase based measurements)

The time update equations are $$x^-(k) = \Phi x^+(k-1)$$

$$P_k^- = \Phi P_{k-1}^+ \Phi^T + Q$$

and the measurement update equations are $$K_k = P_k^- H_k^T [H_k P_k^- H_k^T + R]^{-1}$$

$$P_k^+ = [I - K_k H_k] P_k^- [1 - K_k H_k]^T + K_k R K_k^T$$

$$x^+(k) = x^-(k) + K_k \delta z(k)$$

The state covariance matrix, P, is initialized based on the uncertainty in the marker tag's position.

The extended Kalman filter can be iterated for improved performance. The three measurement update equations are iterated with the error measurement vector and the observation matrix recalculated using the most recent state estimate at the start of that iteration.

The concept described in this section can be implemented using a broad spectrum of radiofrequencies. However, the most likely frequencies are in the range from 0.3 GHz to 300 GHz. This range includes the UHF (0.3 GHz–3 GHz), SHF (3 GHz–30 GHz), and EHF (30 GHz to 300 GHz) bands. The concept can be implemented with a variety of techniques for obtaining the pseudorange measurements.

First Exemplary System Embodiment

In a first exemplary system embodiment, tags 50 and 52 transmit direct-sequence spread-spectrum microwave signal bursts. Sensors 42 down-convert and analog-to-digital (A/D) sample the received signal band. Digital samples from sensors 42 are processed to extract code pseudorange and carrier pseudorange measurements for each of the tags 50 and 52. These pseudorange measurements are processed to determine the tag positions at each sampling instant.

According to simulation results, the system is expected to operate with a capture zone of 130 m×55 m×10 m and can capture the positions of tags 52 anywhere within the zone. The minimum preferred sensor configuration is 8 sensors, one each near each of the vertices of the capture zone. Up to an additional 24 sensors placed around the periphery of the capture zone provide enhanced performance. Sensors 42 are setback such that there is approximately 5 to 15 meters between the front of a sensor and the capture zone. Tags 50 and 52 are generally excluded from a volume defined by a plane tangent to the capture zone at its closest point to a sensor and a parallel plane twice the setback distance of the sensor away from the closes point of the capture zone.

The system is designed to operate with up to 5,000 tags in the capture zone, and to provide full accuracy for tag dynamics up to 4.5 m/s velocity per axis, 0.45 m/s² acceleration per axis, and 0.45 m/s³ jerk per axis. Reduced accuracy is provided for dynamics up to 45 m/s velocity per axis, 4.5 m/s² acceleration per axis, and 4.5 m/s³ jerk per axis. The system provides a 90% probability of capturing each individual tag within the capture zone which has an unobstructed line-of-sight to a minimum of 4 sensors.

According to simulations, the system provides marker tag position outputs in X, Y, Z local level coordinates relative to the location of fixed reference tag 50 placed within the capture zone. The position latency does not exceed 0.1 seconds. The position output rate for each marker tag 52 is preferably selectable from 1, 2, 3, 4, 5, 6, 8, 10, 12, 15, 16, 20, 24, 30, 40, 48, 60, 80, 120, and 240 per second. In a preferred embodiment the output rate is an integer multiple of both 24 and 30, such as 240, for convenient compatibility with frame rates commonly used within the entertainment industry. Output accuracy is 1-mm 1-sigma per axis during periods of limited dynamics, and 10-mm 1-sigma per axis during periods of high dynamics. The output precision is 1-mm per axis.

The total output data rate of the system with 5,000 tags in the capture zone is 9 MBytes/sec of unformatted data or 10.8 MBytes/sec with data formatted to byte boundaries. The position data for each tag can be formatted as 17-bits of X-position, 16-bits of Y-position, 14-bits of Z-position, and 13-bits of tag ID. With byte boundary formatting the output position consists of 3-bytes of X-position, 2-bytes of Y-position, 2-bytes of Z-position, and 2-bytes of tag ID.

Sensors 42 generate digital samples with a timing accuracy of 67 microseconds. They have a minimum 29 dB RF input dynamic range, and their antennas provide a field of view covering the entire capture zone.

Figure 5:
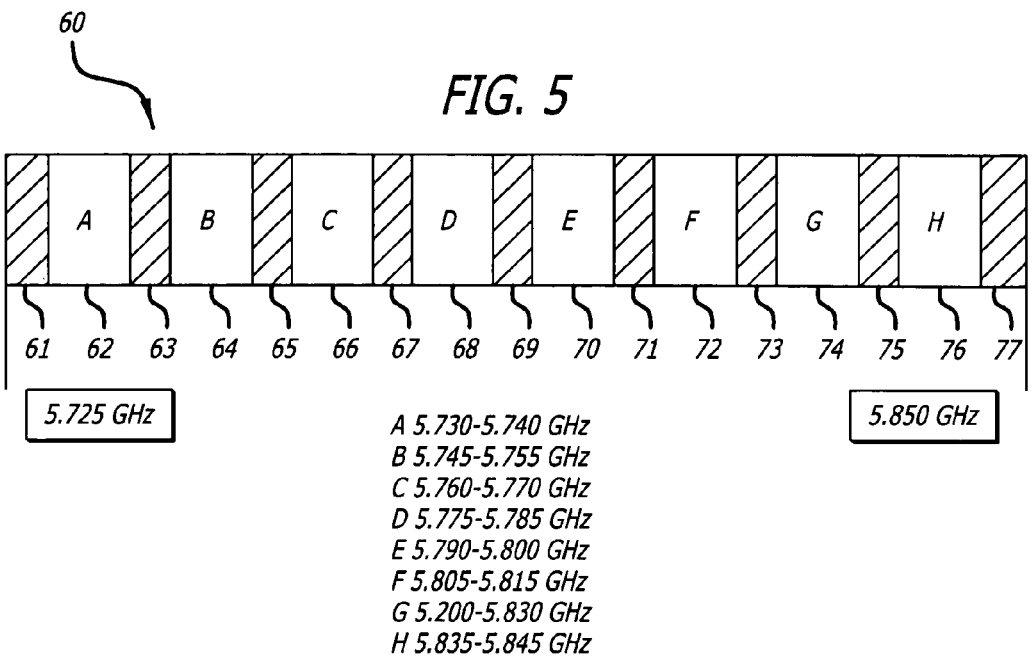
FIG. 5 is a frequency plan diagram for the tag transmissions.

FIG. 5 illustrates the frequency band within which the first exemplary system embodiment operates. This embodiment operates in the 5.725–5.850 GHz frequency band. This frequency band 60 is divided into 8 sub channels, A through H. Each operational sub channel 62, 64, 66, 68, 70, 72, 74, and 76 is 10 MHz wide and separated by 5 MHz guard bands 61, 63, 65, 67, 69, 71, 73, 75, and 77.

Figure 6:
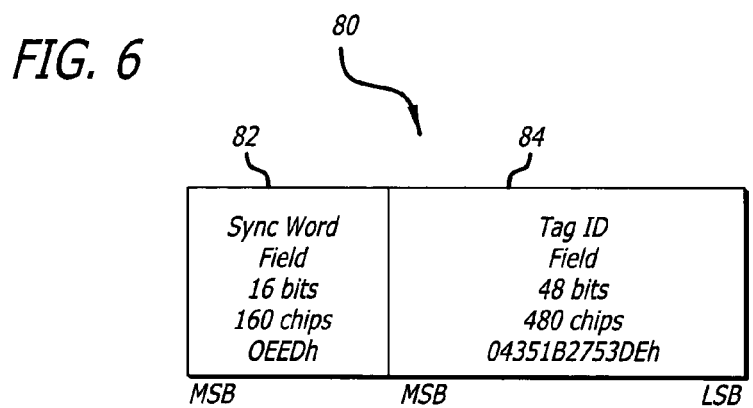
FIG. 6 illustrates a transmission packet structure.
Figure 7:
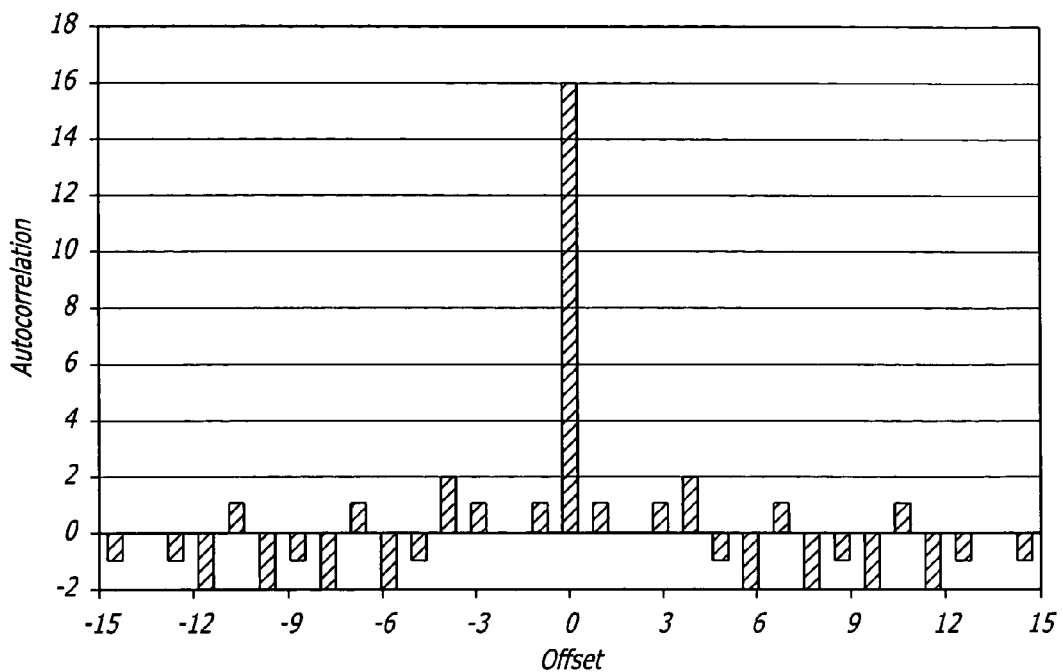
FIG. 7 is an autocorrelation diagram showing the autocorrelation of the sync word used in a preferred embodiment.

FIG. 6 illustrates a transmission packet structure for this embodiment. Each packet 80 includes a 16-bit sync word 82 which is common to each tag. The sync word 82 is chosen for its autocorrelation properties. In the preferred embodiment the 16-bit Neuman-Hofman sync word 0EED hex (0000111011101101 binary) was chosen and is used for all packets. This sync pattern has excellent autocorrelation properties as shown in FIG. 7. Other sync words could be used instead of the particular sync word chosen. Furthermore, it is not necessary that all of the tags transmit the same sync word, but using the same sync word has the advantage of convenience and allows a good sync word to be used for each tag. Still further, sync words having other numbers of bits could be chosen.

Packet 80 also includes a 48-bit tag ID field 84 which is unique to each tag. The unique tag ID for each tag allows the system to distinguish among and automatically track individual tags. With prior art optical reflective tags, when a tag became obscured from the sight of the camera and then reemerged, a system operator needed to identify by hand for the processing system which tag(s) had reappeared and in which position(s). This requirement is eliminated by having each tag emit a unique tag ID code. The tag ID could either be hard wired into the die by various techniques such as by laser vaporization of fuses, or could be programmable via various techniques such as EEPROM, battery backed up RAM, FRAM, UVPROM, and the like.

The tag ID is selected as an arbitrary vector in the [48, 24, 12] binary extended quadratic residue code space. This ensures that all code vectors differ in a minimum of 12 bit positions. The tags do not require an encoder; rather, the tag ID is precomputed and stored in the tag. Also, the sensors do not require decoders since the tags are identified by cross-correlation with prestored patterns. The code generator polynomial is:

$$\prod_{n \in Q} (x - \alpha^n)$$

where Q={1,2,3,4,6,7,8,9,12,14,16,17,18,21,24,25,27,28, 32,34,36,37,42}, and the LSB of the tag ID is computed such that modulo-2 sum of the first 47 bits plus the LSB is 0.

The tag code can also be identified on the tag itself or on tag packaging by a written tag ID, a bar code, or other human- or machine-readable encoding mechanism on the tag. A bar code on each tag, for example, would allow the tag to be scanned by a handheld or stationary bar code reader as part of the process by which the operator identifies once in the process where each tag is used on which part of which object to be tracked. Scanning bar codes representing tag ID codes also enables the system operator to ensure that no two tags having the same tag ID are simultaneously used within the same capture zone.

The multiple access architecture in this exemplary system embodiment is a combination of FDMA (frequency division multiple access) and SSMA (spread-spectrum multiple access). The tags are evenly divided among the 8 different frequency channels. All bursts in each channel are spread using the same 640-chip segment of a long pseudonoise (PN) code which has good autocorrelation properties. Collisions between packets only occur if the first chip of one burst in a channel overlaps the first chip of any other burst in that channel at the sensor. The probability of a collision occurring is $P_C=1-e^{-2\tau\lambda}$ where $\tau$ is the chip duration (100 nsec) and $\lambda$ is channel rate (bursts/sec). For example, with 1 channel and $\lambda=1.2$ million bursts/sec the collision probability is $P_C=21\%$. With 2 channels the bursts/sec per channel are reduced to $\lambda=0.6$ million, and $P_C=11\%$. With 4 channels, $\lambda=0.3$ million bursts/sec/channel and $P_C=5.8\%$. With 8 channels, $\lambda=0.15$ million bursts/sec/channel and $P_C=3.1\%$. Hence, with 8 channels and 240 measurements per second per tag, an average of 7.4 measurements per second per tag are lost due to collisions.

Figure 8:
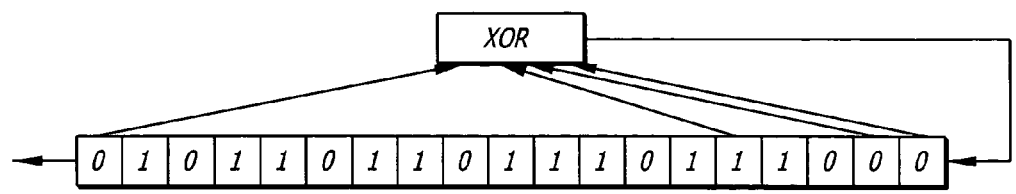
FIG. 8 illustrates a simple shift register generator used to generate transmission sequences.

FIG. 8 illustrates the simple shift register generator for generating the 640-chip PN segment. The segment is generated from ca 19-stage simple shift register generator (SSRG) with maximal length feedback polynomial $x^{19}+x^5+x^2+x$ and initial condition OEEDA hex (0001110111011011010 binary). The SSRG exclusive OR's the bits in $19^{th}$, $5^{th}$, $2^{nd}$, and $1^{st}$ stages to generate an input to the $1^{st}$ stage. The bits are then shifted one stage to the left. The bit in the leftmost stage, the $19^{th}$, is output. The first 640 bits are used. The first 40-bits are 7DBA98EEDA hex.

Figure 9:
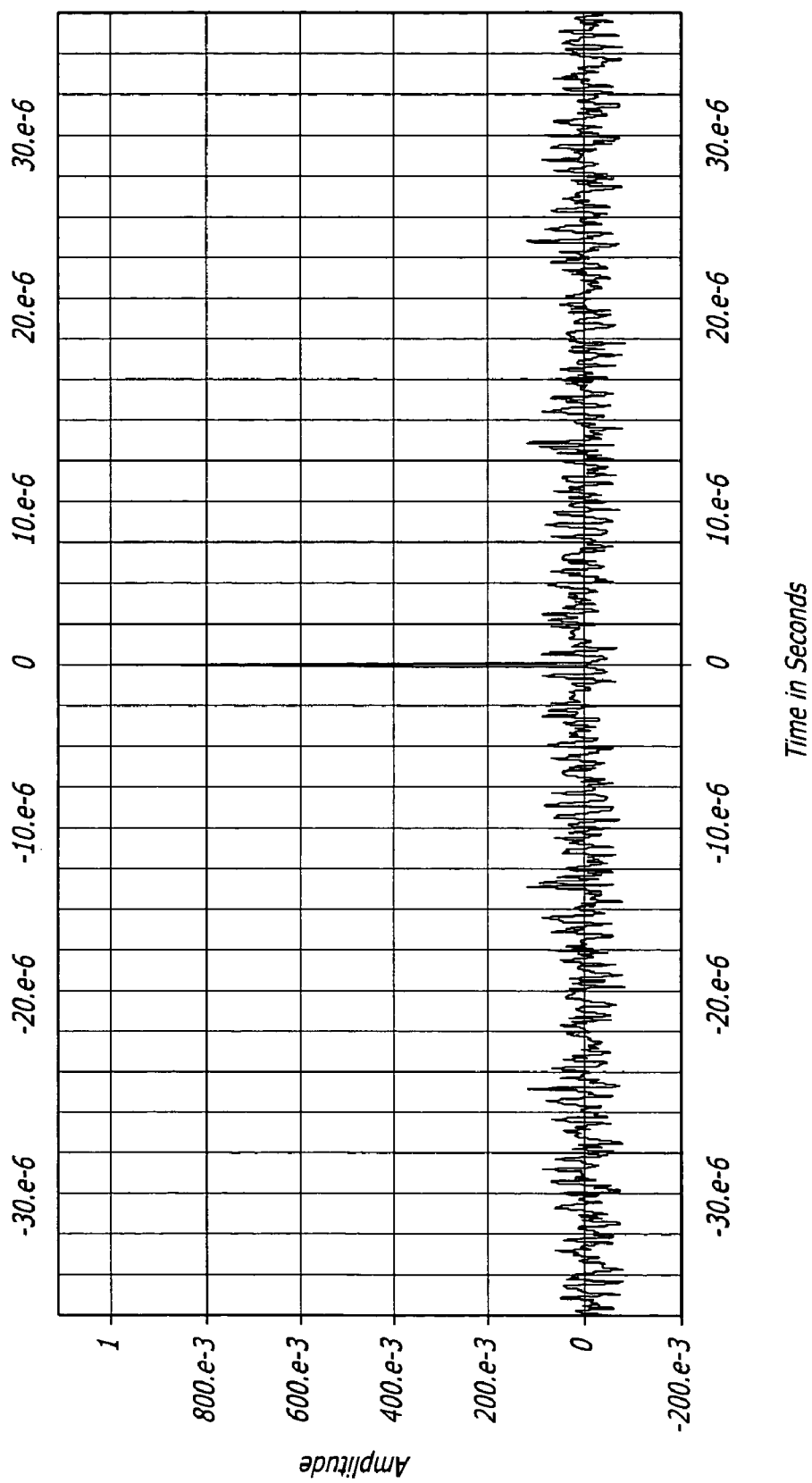
FIG. 9 is an autocorrelation diagram showing the autocorrelation of the 640-bit PN sequence transmitted by a tag in one embodiment of the present invention.

FIG. 9 illustrates the autocorrelation for the 640-bit PN sequence.

The carrier is Gaussian Minimum Shift Keying (GMSK) modulated by the 10 Mbps chip sequence with a bandwidth time product (BT)=0.3. The link budget is given in Table 1 below:

TABLE 1

| Link Budget | |
|---|---|
| | 5.8 GHz |
| Peak Transmit Power (dBW) | −31.2 |
| Peak Transmit Power (mW) | 0.75 |
| Feed Loss (dB) | 1.0 |
| Transmit Antenna Peak Gain (dB) | −6.0 |
| EIRP (dBW) | −38.2 |
| Free Space Loss (dB) | 92.0 |
| Frequency (GHz) | 5.8 |
| Path Length (Km) | 0.16 |
| Polarization Loss (dB) | 0.00 |
| Gaseous Loss (dB) | 0.0 |
| Rain Loss @ 99.9% Rain Avalibility (dB) | 0.0 |
| Total Transmission Loss (dB) | 92.0 |
| Receive Antenna Peak Gain (dB) | 6.2 |
| Polarization Mismatch Loss (dB) | 0.2 |
| Transmit Ant Axial Ratio (dB) | 2.0 |
| Receive Ant Axial Ratio (dB) | 2.0 |
| Pointing Loss (dB) | 3.0 |
| System Noise Temp @ Antenna (dB-° K.) | 27.6 |
| Feed Loss (dB) | 1.0 |
| Receiver Noise Figure (dB) | 2.0 |

TABLE 1-continued

| Link Budget | |
|---|---|
| | 5.8 GHz |
| Antenna Temperature (° K.) | 290 |
| Receiver/Feed Noise Temp (° K.) | 289 |
| System Noise Temp @ Ant (° K.) | 579 |
| G/T (dB/° K.) | −24.6 |
| Avaliable C/No (dB-Hz) | 73.7 |
| Information Rate (dB-Mbps) | 60.0 |
| Information Rate (Mbps) | 1 |
| Required Eb/No (dB) | 6.0 |
| Implementation Loss (dB) | 2.0 |
| Required C/No (dB-Hz) | 68.0 |
| Unallocated Margin (dB) | 5.7 |

Figure 10:
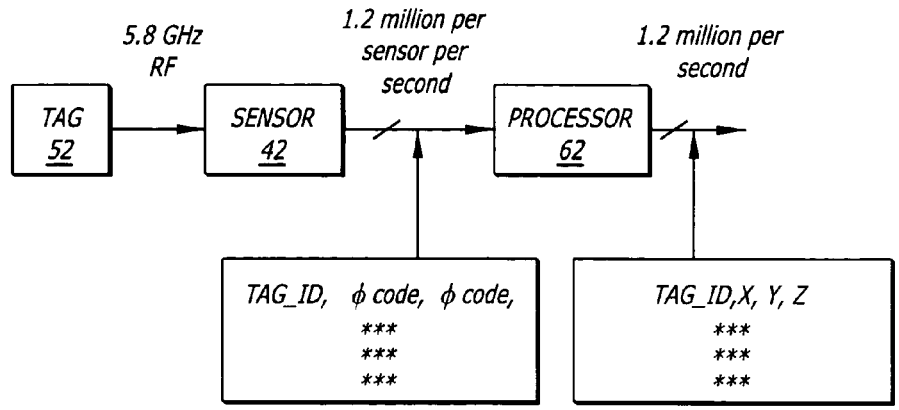
FIG. 10 is a system interface functional diagram.

FIG. 10 is an interface functional diagram showing the functional interface between marker tag 52, sensor 42, and processor 62. Each tag 52 periodically emits a data packet modulated on a 5.8 GHz RF carrier. Sensors 42 receive and demodulate the packets from the tags 52, and process them to extract the tag ID, code phase, and carrier phase. This data is provided to processor 62 at a rate of 1.2 million measurements per second per sensor. The processor processes the measurements to determine X, Y, and Z position coordinates for each tag, a total of 1.2 million positions per second.

Figure 11:
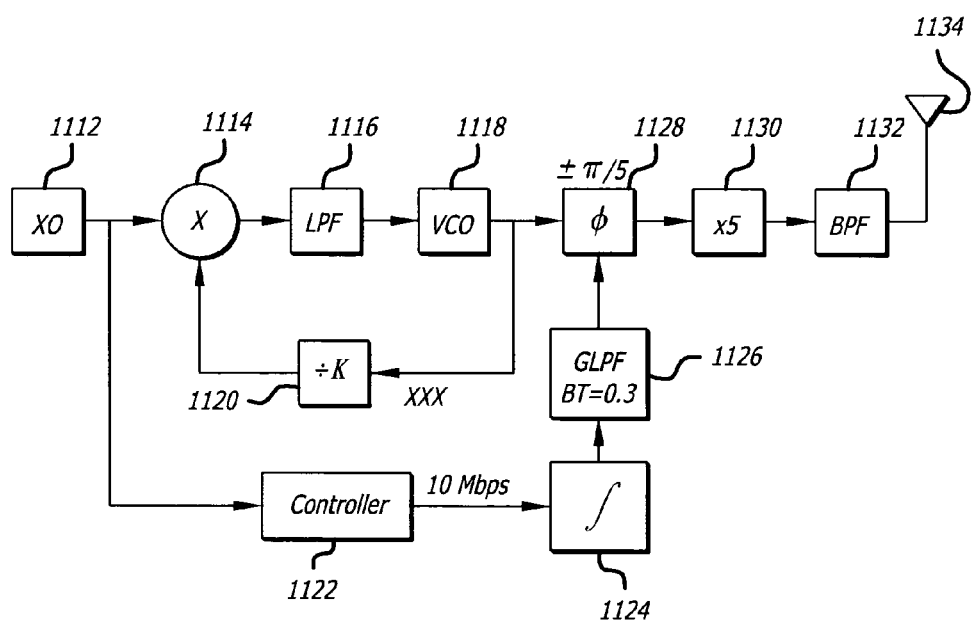
FIG. 11 is a functional diagram of a first tag embodiment.

FIG. 11 is a functional block diagram of a first tag embodiment for the first system embodiment. Crystal oscillator (XO) 1112 generates a reference carrier. A phase-lock-loop (PLL), consisting of a phase/frequency detector, low-pass filter (LPF) 1116 and divider 1120, is used to stabilize the output of a nominal 1.16 GHz voltage controlled oscillator (VCO) 1118 by locking it to the XO reference carrier. The stabilized VCO output is phase modulated by a linear modulator 1128 with range $-\pi/5$ to $\pi/5$. The VCO output is then applied to a ×5 frequency multiplier 1130. The multiplier 1130 output is filtered by band pass filter (BPF) 1132 to remove undesired harmonics. The modulating signal is generated by integrating at integrator 1124 the controller 1122 output waveform, and then filtering it at Gaussian low pass filter (GLPF) 1126 having a bandwidth-time product 0.3. Controller 1122 periodically generates a data packet consisting of a synchronization header and a tag ID, both spread by a 10 Mbps pseudo-noise code. The waveform is transmitted at tag antenna 1134.

Figure 12:
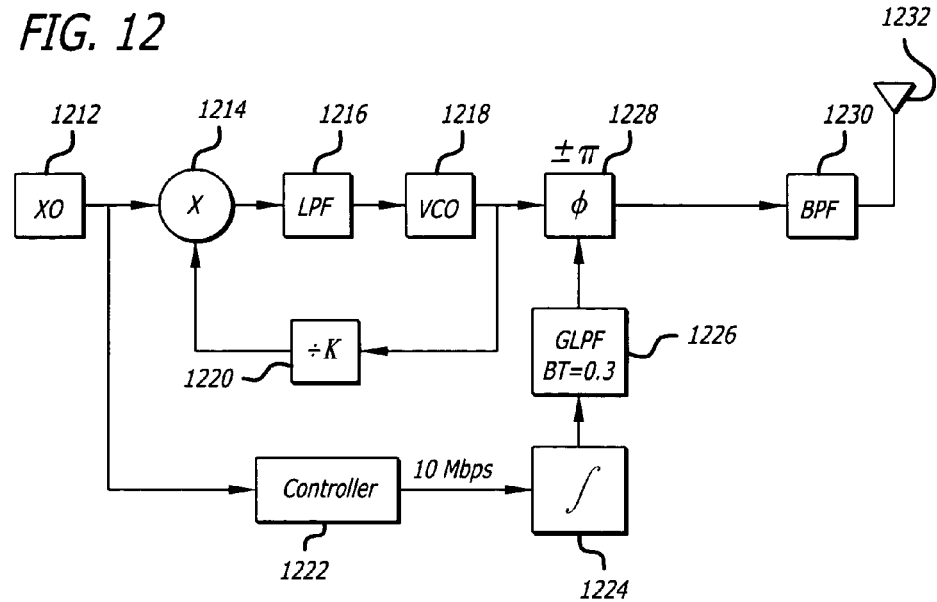
FIG. 12 is a functional diagram of second tag embodiment.

FIG. 12 is a functional block diagram of a second tag embodiment for the first system embodiment. In this embodiment the crystal oscillator (XO) 1212 generates a reference clock. A phase-lock-loop (PLL), consisting of a phase/frequency detector, low-pass filter (LPF) 1216 and divider 1220, is used to stabilize the output of a nominal 5.8 GHz voltage controlled oscillator (VCO) 1218 by locking it to the XO reference clock. The stabilized VCO output is phase modulated by a linear modulator 1228 with range $-\pi$ to $\pi$. The modulator output is filtered at band pass filter (BPF) 1230. The modulating signal is generated by integrating at integrator 1224 the controller 1222 output waveform, and then Gaussian low-pass filtering it at Gaussian low pass filter (GPLF) 1226 with bandwidth-time product 0.3. Controller 1222 periodically generates a data packet consisting of a synchronization header and a tag ID, both spread by a 10 Mbps pseudo-noise code. The waveform is transmitted at tag antenna 1232.

Figure 13:
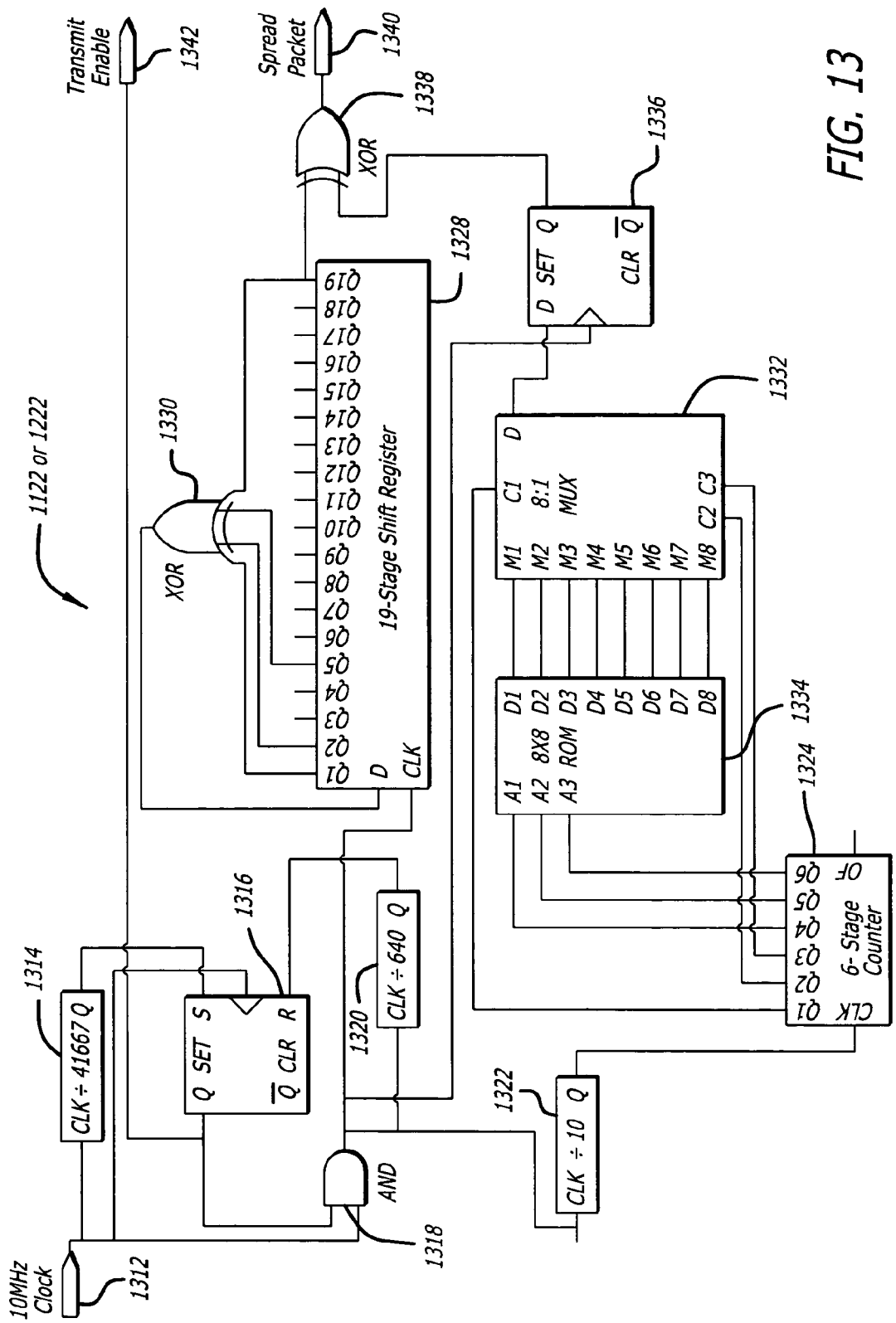
FIG. 13 is a schematic diagram of an exemplary tag controller circuit according to a first tag controller embodiment.

FIG. 13 is a circuit schematic of a first implementation of tag controller 1112 or 1222. The 10-MHz tag clock 1312 is divided by 41667 by clock divider 1314 to generate the 240 Hz packet clock. The packet clock sets the enable latch 1316 which allows the 10 MHz clock signal to pass through the AND gate 1318, and enables the transmitter. The gated 10 MHz clock is divided at clock divider 1320 by 640 clocks to reset the enable latch and disable the transmitter after the packet transmission has been completed.

The gated 10 MHz clock is used to shift the 19-stage shift register 1328. This shift register is initialized to OEEDA hex (0001110111011011010 binary) at the start of each packet. The outputs from the $1^{st}$, $2^{nd}$, $5^{th}$, and $19^{th}$ stages are input to an exclusive-or (XOR) gate 1330. The gate output is then input to the first stage of the shift register. The shift register output, the output of the $19^{th}$ stage, is applied to the output exclusive-or (XOR) gate 1338.

The gated 10 MHz clock is divided by 10 at clock divider 1322 to form a 1 MHz clock. This clock is used to drive a 6-stage (divide by 64) counter 1324. The three MSB's of the counter state are used to address an 8×8 ROM 1334, which contains the packet data. The addressed 8-bit ROM data is applied to an 8-to-1 MUX 1332. The three LSB's of the counter state are used to select the MUX output. The MUX output is reclocked by the 10-MHz gated clock via D flip-flip 1336, and then applied to the output exclusive-or (XOR) gate 1338.

Figure 14:
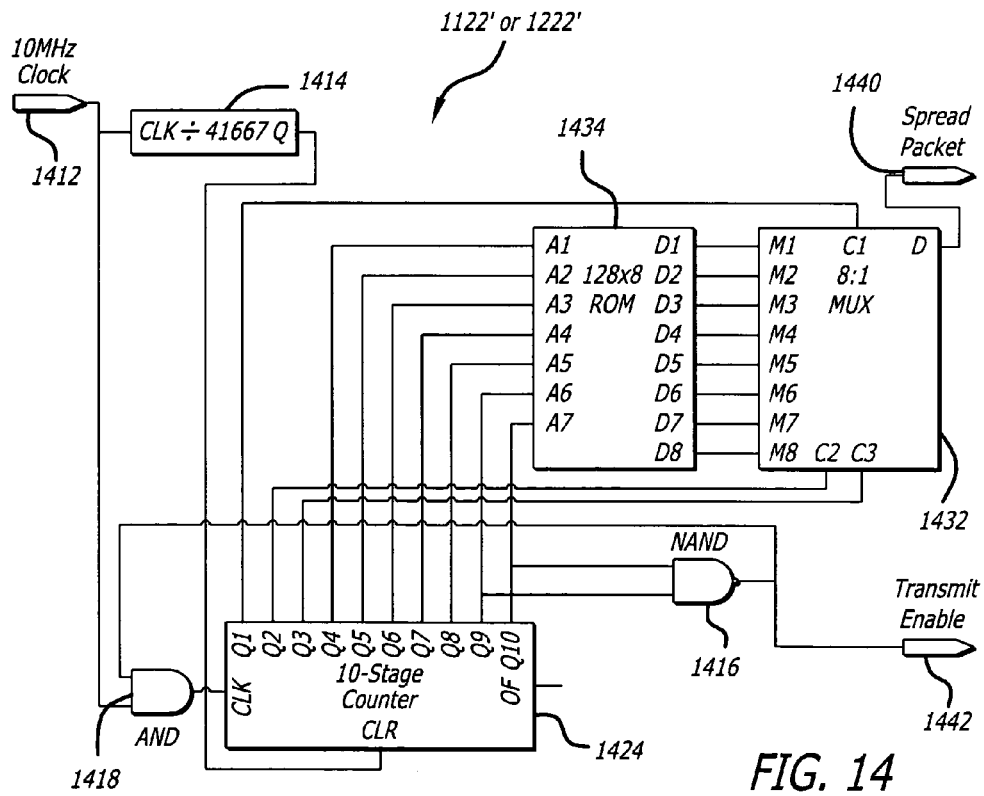
FIG. 14 is a schematic diagram of exemplary tag controller circuitry according to a second tag controller embodiment.

FIG. 14 is a circuit diagram of a second possible implementation, 1122' or 1222', of tag controller 1122 or 1222. The 10-MHz tag clock 1412 is divided by 41667 at clock divider 1414 to generate the 240 Hz packet clock. This packet clock resets a 10-stage (divide by 1024) counter 1424. The counter state NOT 640 is decoded and used to gate the 10 MHz clock and to enable the transmitter. The gated 10 MHz clock is used to clock counter 1424. When the counter state reaches 640, the gated clock is disabled, stopping the counter 1424, and the transmitter is disabled. The seven MSB's of the counter state are used to address a 128×8 ROM 1434, which contains the 640 bits of spread packet data. The addressed 8-bit ROM data is applied to an 8-to-1 MUX 1432. The three LSB's of the counter state are used to select the MUX output, which provides the controller output.

Figure 15:
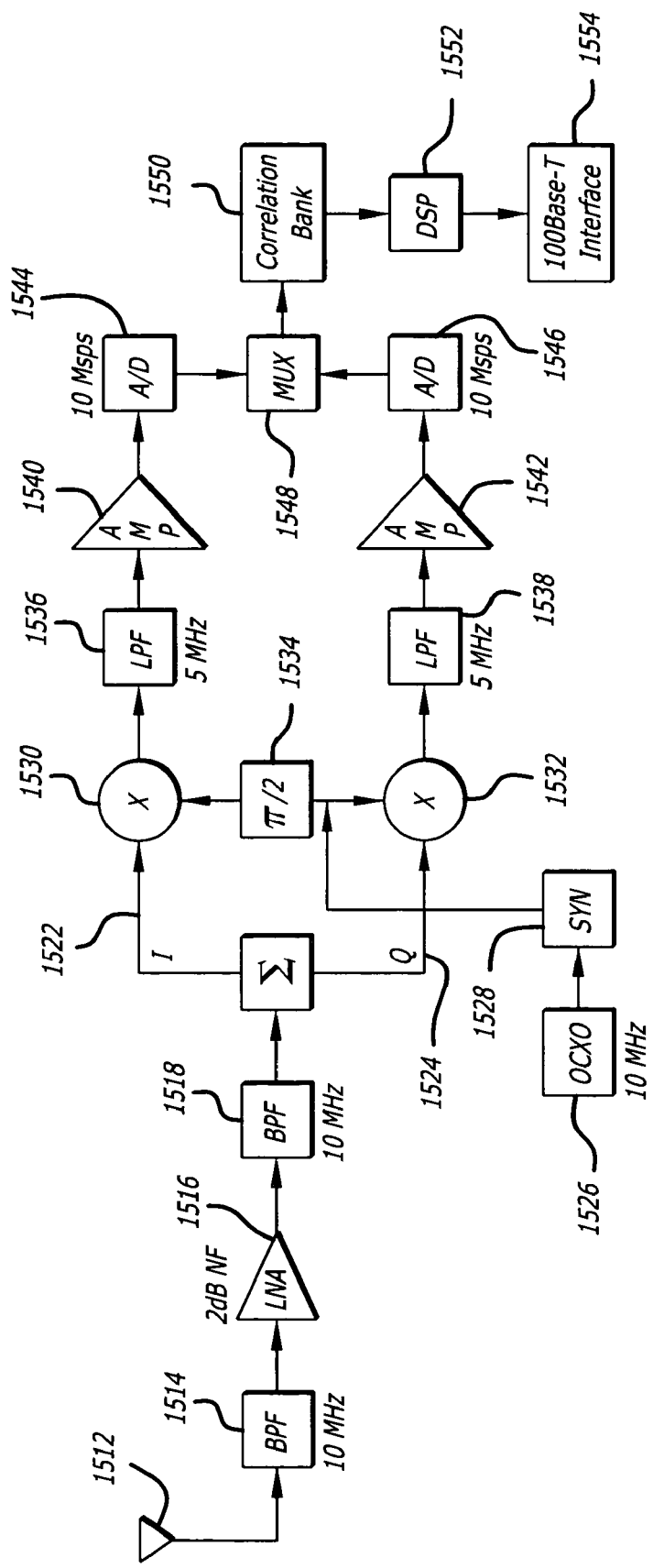
FIG. 15 is a functional block diagram of a sensor.

FIG. 15 is a functional block diagram of one of the sensors 42. The sensor receives the 5.8-GHz signals from the tags via receiver antenna 1512, bandpass filters them at bandpass filter 1514 to remove interference, and low noise amplifies them through amplifier 1516 to set the receiver noise floor. The low noise amplified signals are then bandpass filtered again at band pass filter 1518 to limit the noise power, and converted into in-phase and quadrature-phase baseband signals 1522 and 1524, respectively. The baseband signals are low pass filtered at low pass filters 1536 and 1538, amplified at amplifiers 1540 and 1542, and sampled and quantized at analog-to-digital converters 1544 and 1546. Note that the conversion clocks for analog-to-digital converters 1544 and 1546, which constitute the receiver clock, are not synchronized to any of the transmitters' clocks or to any of the other receivers' clocks. The digital in-phase and quadrature-phase samples are multiplexed at multiplexer 1548 into a single data stream which is applied to a bank of correlators 1550. The correlators determine parameters that are converted into the most likely tag ID, code phase, and carrier phase by the digital signal processor (DSP) 1552. These estimates are then output to the 100Base-T Ethernet interface 1554 for transfer to the processing system 62.

Figure 16:
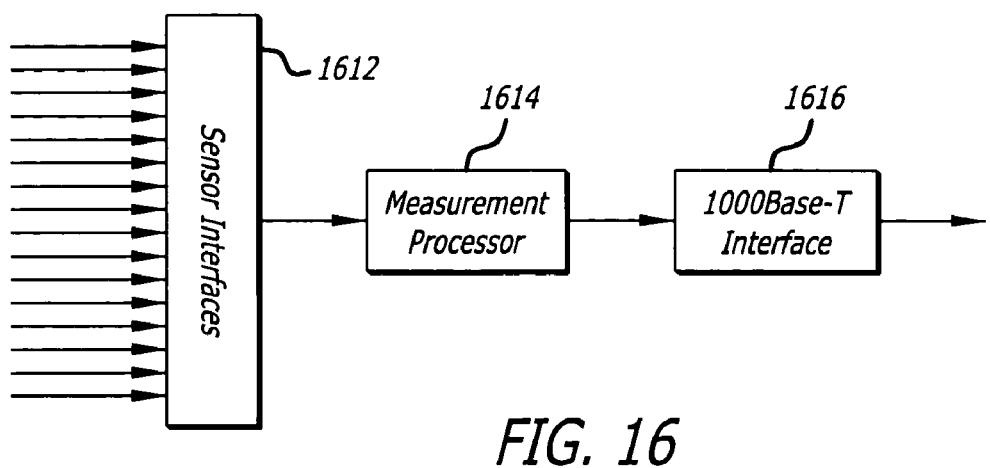
FIG. 16 is a functional block diagram of the processor for processing received tag signals.

FIG. 16 is a functional block diagram of processor 62 for processing received tag signals. The data on the 100Base-T interfaces 1612 from the various sensors 42 is input to the measurement processor 1614, which converts the code and carrier phases into position estimates. The estimates are output via a 1000Base-T Gigabit Ethernet interface 1616.

Processor 62 uses the code and carrier pseudorange measurements from sensors 42 to determine the tag positions at the sampling instants. Raw position information is then output. All positions are relative to the reference tag 50. Of course, when the position of the reference tag 50 is known, the positions relative to any arbitrary reference point or tag within the capture zone can be computed using known coordinate transformation algorithms. The code pseudorange measurements are processed as previously described to provide a code phase measurement which provides a rough position estimate. This rough estimate is used to bound the ambiguity search, and carrier pseudorange measurements are processed to obtain the final position estimate. That is, the code phase determination provides a rough estimate of position, and the carrier phase determination provides a fine position determination within the rough estimate. Code phase and carrier phase measurements are themselves known within the art and described in the literature.

The code pseudorange measurement error standard deviation is given by:

$$\sigma_{code} = \frac{c}{R\sqrt{T\frac{C}{N_0}}}$$

where
  R is code rate (10 Mcps)
  T is measurement duration (48 bits/1 Mbps=48×10$^{-6}$ s)
  C/N$_0$ is carrier-to-noise density ratio (68 dB-Hz @ threshold)

This gives a value of $\sigma_{code}$=1,724 mm, or $\sigma_{DoubleDiff}$=$\sqrt{4}\times\sigma_{code}$=3,448 mm.

The other code pseudorange position error sources are a 1 m sensor position error, and a 1 m multipath error which requires some form of mitigation to achieve. The remaining error sources are small, including sensor antenna phase center variation, and the atmospheric refraction. The error budget is shown in Table 2.

TABLE 2

Code Pseudorange Position Error Budget

| Error Source | 1σ Error |
| --- | --- |
| Measurement | 3,448 mm |
| Sensor Position Error | 1,000 mm |

TABLE 2-continued

Code Pseudorange Position Error Budget

| Error Source | 1σ Error |
| --- | --- |
| Multipath | 1,000 mm |
| RSS Error | 3,727 mm |
| Max 8-Sensor PDOP in Capture Zone/$\sqrt{3}$ | × 0.96 |
| 1σ Position Error per Axis | 3,578 mm |

The carrier pseudorange measurement equation is $$\lambda[\phi_i^A(n)+N_i^A] = |r^A(n)-s_i| - c[T^A(n)-T_i(n)]$$

where $N_i^A$ is the integer number of cycles between tag A and sensor i at a reference time $\phi_i^A$ is the fractional phase at the reference time plus the accumulated measured phase change since the reference time (cycles)

$\lambda$ is the carrier wavelength (meters/cycle)

Double differences can be formed similarly to code pseudorange measurements as $$\delta\phi_{ij}^{AR}(n) = \lambda[\delta\phi_i^A(n)-\delta\phi_i^R(n)-\delta\phi_j^A(n)+\delta\phi_j^R(n)] = -|s_i|+|s_j|+|r^A(n)-s_i|-|r^A(n)-s_j|-\delta N_{ij}^{AR}$$

where $$\delta N_{ij}^{AR} = \lambda[N_i^A - N_j^A - N_i^R + N_j^R]$$

If the $\delta N_{ij}^{AR}$ are known, then the direct, least squares, and extended Kalman filter solutions, and associated PDOP and fault detection and isolation algorithms discussed in the section entitled Processing Algorithms, are applicable. If the integers are unknown, they can be eliminated by forming triple differences, by differencing the double differences between two epochs $$\delta\phi_{ij}^{AR}(n,n+1) = \delta\phi_{ij}^{AR}(n) - \delta\phi_{ij}^{AR}(n+1) = |r^A(n)-s_i| - |r^A(n)-s_j| - |r^A(n+1)-s_i| + |r^A(n+1)-s_j|$$

The six unknowns are the marker tag A position vectors at time epochs n and n+1, $r^A(n)$ and $r^A(n+1)$. Measurements from seven sensors at these two time epochs are required to form the six independent triple differences required to obtain six independent equations in these six unknowns. These equations can be linearized around an approximate solution, either from a previous epoch or from the code pseudorange solution, and the resulting linear equations solved for the marker tag A coordinates.

For (M+1) Sensors, M≧6, and linearization around an approximate solution, [$r^0(n)$, $r^0(n+1)$] the generalized least squares solution is:

$$x^A(n) = x^0(n) + \delta x^A$$

where $$x^A(n) = \begin{bmatrix} r^A(n) \\ r^A(n+1) \end{bmatrix} \quad x^0(n) = \begin{bmatrix} r^0(n) \\ r^0(n+1) \end{bmatrix}$$

$$\delta x^A = (H_n^T H_n)^{-1} H_n^T \delta z$$

$$\delta z = \begin{bmatrix} \delta PR_{0,1}^{AR}(n,n+1) - |r^0(n)-s_0| - |r^0(n)-s_1| - |r^0(n+1)-s_0| + |r^0(n+1)-s_1| \\ \delta PR_{1,2}^{AR}(n,n+1) - |r^0(n)-s_1| - |r^0(n)-s_2| - |r^0(n+1)-s_1| + |r^0(n+1)-s_2| \\ \vdots \\ \delta PR_{M,M+1}^{AR}(n,n+1) - |r^0(n)-s_M| - |r^0(n)-s_{M+1}| - |r^0(n+1)-s_M| + |r^0(n+1)-s_{M+1}| \end{bmatrix}$$

$$H_n = \begin{bmatrix} \alpha x_{0,1}^A(n) & \alpha y_{0,1}^A(k) & \alpha z_{0,1}^A(k) & -\alpha x_{0,1}^A(n+1) & -\alpha y_{0,1}^A(n+1) & -\alpha z_{0,1}^A(n+1) \\ \alpha x_{1,2}^A(n) & \alpha y_{1,2}^A(k) & \alpha z_{1,2}^A(k) & -\alpha x_{1,2}^A(n+1) & -\alpha y_{1,2}^A(n+1) & -\alpha z_{1,2}^A(n+1) \\ \vdots & \vdots & \vdots & \vdots & \vdots & \vdots \\ \alpha x_{M,M+1}^A(n) & \alpha y_{M,M+1}^A(n) & \alpha z_{M,M+1}^A(n) & -\alpha x_{M,M+1}^A(n+1) & -\alpha y_{M,M+1}^A(n+1) & -\alpha z_{M,M+1}^A(n+1) \end{bmatrix}$$

The least squares solution only exists if rank($H_n$)=6. A necessary condition is that marker tag A has moved between epochs n and n+1. Otherwise, the last three columns of the observation matrix H are the negatives of the first three, and rank(H)≦3. Since it is unlikely that the tag will have moved sufficiently during a single epoch to provide good observability, it is either necessary to use two epochs sufficiently spaced in time, or to determine the $\delta N_{ij}^{AR}$.

One option is to use the double differences and estimate the double difference integers. Each double difference is a function of the three marker tag A coordinates and its double difference integer number of cycles. Thus for (M+1) sensors we have M equations in M+3 unknowns. This is an underdetermined problem. For (M+1) sensors and L epochs, we have L×M equations in M+3×L unknowns. So, with 2 epochs (L=2) we need measurements from 7 sensors (M=6). Similarly, with 4 epochs (L=4) we need measurements from 5 sensors (M=4). Unfortunately, these systems of equations suffer from the same observablity concerns as the triple difference system. Significant tag A motion is required between epochs. However, since now we are estimating the $\delta N_{ij}^{AR}$, consecutive epochs are not required.

For 2 epochs, n and n+k, and for (M+1) sensors, M≧6, and linearization around an approximate solution, the generalized least squares solution is:

$$x^A(n) = x^0(n) + \delta x^A$$

where $$x^A(n) = \begin{bmatrix} r^A(n) \\ r^A(n+k) \\ \delta N_{0,1}^{AR} \\ \delta N_{1,2}^{AR} \\ \vdots \\ \delta N_{M,M+1}^{AR} \end{bmatrix} \quad x^0(n) = \begin{bmatrix} r^0 \\ r^0(n+k) \\ \delta N_{0,1}^{0} \\ \delta N_{1,2}^{0} \\ \vdots \\ \delta N_{M,M+1}^{0} \end{bmatrix}$$

$$\delta x^A = (H_n^T H_n)^{-1} H_n^T \delta z$$

$$\delta z = \begin{bmatrix} \delta PR_{0,1}^{AR}(n) + |s_0| - |s_1| - |r^0(n) - s_0| + |r^0(n) - s_1| + \delta N_{0,1}^{AR} \\ \delta PR_{1,2}^{AR}(n) + |s_1| - |s_2| - |r^0(n) - s_1| + |r^0(n) - s_2| + \delta N_{1,2}^{AR} \\ \vdots \\ \delta PR_{M,M+1}^{AR}(n) + |s_M| - |s_{M+1}| - |r^0(n) - s_M| + |r^0(n) - s_{M+1}| + \delta N_{M,M+1}^{AR} \\ \delta PR_{0,1}^{AR}(n+k) + |s_0| - |s_1| - |r^0(n+k) - s_0| + |r^0(n+k) - s_1| + \delta N_{0,1}^{AR} \\ \delta PR_{0,1}^{AR}(n+k) + |s_1| - |s_2| - |r^0(n+k) - s_1| + |r^0(n+k) - s_2| + \delta N_{1,2}^{AR} \\ \vdots \\ \delta PR_{M,M+1}^{AR}(n+k) + |s_M| - |s_{M+1}| - |r^0(n+k) - s_M| + |r^0(n+k) - s_{M+1}| + \delta N_{M,M+1}^{AR} \end{bmatrix}$$

$$H_n = \begin{bmatrix} G_n & 0 & I_M \\ 0 & -G_{n+k} & I_M \end{bmatrix}$$

$$G_n = \begin{bmatrix} \alpha x_{0,1}^A(n) & \alpha y_{0,1}^A(n) & \alpha z_{0,1}^A(n) \\ \alpha x_{1,2}^A(n) & \alpha y_{1,2}^A(n) & \alpha z_{1,2}^A(n) \\ \vdots & \vdots & \vdots \\ \alpha x_{M,M+1}^A(n) & \alpha y_{M,M+1}^A(n) & \alpha z_{M,M+1}^A(n) \end{bmatrix}$$

One approach for using this algorithm is to perform a Marker Tag Double Difference Integer Calibration (MTDDIC). The Processor 62 is placed in MTDDIC mode. The reference tag 50 and marker tags 52 are placed in the capture zone. The marker tags are then moved around inside the capture zone, either in a predetermined MTDDIC pattern or until the Processor has observed sufficient motion based on processing of the code pseudorange measurements to guarantee good observability for the double difference integers. In the later case, the processor indicates when sufficient motion has been observed for each of the marker tags. In both cases, AR the state estimate is calculated as described above. Once the $\delta N_{ij}^{AR}$ are known, as long as each sensor maintains phase lock on each Tag signal, the algorithms discussed in the section above entitled Processing Algorithms can be used to process the double difference phases.

In another approach that does not require a calibration mode, the Processor stores the double difference phase measurements until it has determined the $\delta N_{ij}^{AR}$ values, then processes them using the algorithms discussed in the Processing Algorithms section above to solve for the time history of marker tag positions. The processor waits until sufficient motion based on processing of the code pseudorange measurements has occurred to guarantee good observability for the double difference integers. Then it solves for them. Once the integers have been resolved, position estimates are generated in real-time using the algorithms discussed in the Processing Algorithms section to process the double difference phases. This approach is also applicable after MTDDIC if phase lock is lost on one of the tags or sensors.

Still another approach is to use an extended Kalman filter. The time update and measurement update equations are identical to those described in the Processing Algorithms section. The differences in the state equation and measurement model are:

$x(k) = [r(k)^T v(k)^T a(k)^T n^T]^T$ is the (9+M)×1 state vector r(k) is the 3×1 marker tag position vector
v(k) is the 3×1 marker tag velocity vector
a(k) is the 3×1 marker tag acceleration vector
n is the M×1 vector of double difference integers, $\delta N_{ij}^{AR}$ $$\Phi = \begin{bmatrix} 1 & 0 & 0 & \Delta T & 0 & 0 & \Delta T^2/2 & 0 & 0 & 0 & \cdots & 0 \\ 0 & 1 & 0 & 0 & \Delta T & 0 & 0 & \Delta T^2/2 & 0 & 0 & \cdots & 0 \\ 0 & 0 & 1 & 0 & 0 & \Delta T & 0 & 0 & \Delta T^2/2 & 0 & \cdots & 0 \\ 0 & 0 & 0 & 1 & 0 & 1 & \Delta T & 0 & 0 & 0 & \cdots & 0 \\ 0 & 0 & 0 & 0 & 1 & 0 & 0 & \Delta T & 0 & 0 & \cdots & 0 \\ 0 & 0 & 0 & 0 & 0 & 1 & 0 & 0 & \Delta T & 0 & \cdots & 0 \\ 0 & 0 & 0 & 0 & 0 & 0 & 1 & 0 & 0 & 0 & \cdots & 0 \\ 0 & 0 & 0 & 0 & 0 & 0 & 0 & 1 & 0 & 0 & \cdots & 0 \\ 0 & 0 & 0 & 0 & 0 & 0 & 0 & 0 & 1 & 0 & \cdots & 0 \\ 0 & 0 & 0 & 0 & 0 & 0 & 0 & 0 & & & & \\ \vdots & \vdots & \vdots & \vdots & \vdots & \vdots & \vdots & \vdots & & I_M & & \\ 0 & 0 & 0 & 0 & 0 & 0 & 0 & 0 & & & & \end{bmatrix}$$

$Q = E[w(k)w(k)^T]$

-continued $$= \sigma_A^2$$

$$= \begin{bmatrix} \begin{bmatrix} & & \\ & 0_6 & \\ & & \end{bmatrix} & \begin{bmatrix} & & \\ & 0_{6\times 3} & \\ & & \end{bmatrix} & \begin{bmatrix} & & \\ & & \\ & & 0_{9\times M} \end{bmatrix} \\ \begin{bmatrix} & & \\ & 0_{3\times 6} & \end{bmatrix} & \begin{bmatrix} & \\ & I_3 \end{bmatrix} & \\ \begin{bmatrix} & & \\ & 0_{M\times 9} & \end{bmatrix} & & \begin{bmatrix} \\ 0_M \end{bmatrix} \end{bmatrix}$$

$$\delta z(k) = \begin{bmatrix} \delta PR_{0,1}^{AR}(k) + |s_0| - |s_1| - |r^0(k) - s_0| + |r^0(k) - s_1| + \delta N_{0,1}^{AR} \\ \delta PR_{1,2}^{AR}(k) + |s_1| - |s_2| - |r^0(k) - s_1| + |r^0(k) - s_2| + \delta N_{1,2}^{AR} \\ \vdots \\ \delta PR_{M,M+1}^{AR}(k) + |s_M| - |s_{M+1}| - |r^0(k) - s_M| + |r^0(k) - s_{M+1}| + \delta N_{M,M+1}^{AR} \end{bmatrix}$$

$$H_k = \begin{bmatrix} \alpha x_{0,1}^A(k) & \alpha y_{0,1}^A(k) & \alpha z_{0,1}^A(k) & \\ \alpha x_{1,2}^A(k) & \alpha y_{1,2}^A(k) & \alpha z_{1,2}^A(k) & \\ \vdots & \vdots & \vdots & I_M \\ \alpha x_{M,M+1}^A(k) & \alpha y_{M,M+1}^A(k) & \alpha z_{M,M+1}^A(k) & \end{bmatrix}$$

$$R = E[v(k)v(k)^T] = 4\sigma_{PR}^2 \begin{bmatrix} 1 & -\frac{1}{2} & 0 & \cdots & 0 & 0 \\ -\frac{1}{2} & 1 & -\frac{1}{2} & \cdots & 0 & 0 \\ 0 & -\frac{1}{2} & 1 & \cdots & 0 & 0 \\ \vdots & \vdots & \vdots & \vdots & \vdots & \vdots \\ 0 & 0 & 0 & \cdots & 1 & -\frac{1}{2} \\ 0 & 0 & 0 & \cdots & -\frac{1}{2} & 1 \end{bmatrix}$$

$\sigma_{PR}$ is the carrier phase pseudo-range standard deviation (nominally 0.00025 m)

The state covariance matrix, P, is initialized based on the uncertainty in each marker tag's position. The code pseudorange solution provides a nominal uncertainty of 3.5 meters per axis.

Since the marker tag position outputs from the system can be up to 100 ms delayed, a fixed-lag optimal smoother can be used to determine the tag positions.

Numerous approaches have been described in the literature for GPS ambiguity resolution; they are generally applicable to resolving the double difference integers with minor modifications. These include system identification, particle filtering, least squares ambiguity decorrelation adjustment, fast ambiguity resolution approach, fast ambiguity search filters, genetic algorithms, and interfere nonlinear programming methods.

The carrier pseudorange measurement error standard deviation is given by $$\sigma_{carrier} = \frac{c}{2\pi F \sqrt{T \frac{C}{N_0}}}$$

where
c is speed of light ($3 \times 10^8$ m/s)
F is carrier frequency (5.8 GHz)
T is measurement duration (48 bits/1 Mbps=$48 \times 10^{-6}$ s)
$C/N_0$ is carrier-to-noise density ratio (68 dB-Hz at threshold)
The resulting $\sigma_{carrier}$ is 0.47 mm at threshold, 0.24 mm at 73.7 dB-Hz $C/N_0$, and 0.024 mm at 93.4 dB-Hz $C/N_0$.

The carrier pseudorange measurements must be corrected for the radio refractive index. Range is related to propagation time by the speed of light, i.e., the range from a to b is equal to the speed of light times the propagation time from a to b. The speed of light in a vacuum is $c = 2.99792458 \times 10^8$ m/s. In atmosphere the speed of light is $c/(1+N \times 10^{-6}) \approx c \times (1 - N \times 10^{-6})$ where N is the radio refractivity (N-units) which can be estimated as $$N = \frac{77.6}{T + 273}\left(P + 481 \frac{Hae^{\frac{bT}{c+T}}}{10(T + 273)}\right)$$

where
T is the atmospheric temperature (° C.)
P is the atmospheric pressure (hPa)
H is the relative humidity (%)
(a, b, c) are equal to (6.1121, 17.502, 240.97) for $-20°$ C.$<T<+50°$ C., and equal to (6.1115, 22.452, 272.55) for $-50°$ C.$<T<-20°$ C.

The estimation error is less than 5%. Table 3 shows the corrections required for a 150 m path for various atmospheric conditions.

TABLE 3

| | Correction Required for 150 m Path | | | |
|---|---|---|---|---|
| Atmosphere Model | Temp (° C.) | Pressure (hPa) | Humidity (%) | Correction (mm) |
| Standard | 15 | 1013 | 58 | 47.7 |
| Dry | 15 | 1013 | 0 | 40.9 |
| Low Lat | 27 | 1012 | 76 | 56.2 |
| Mid Lat Summer | 22 | 1013 | 74 | 52.5 |
| Mid Lat Winter | 0 | 1019 | 72 | 46.7 |
| High Lat Summer | 14 | 1008 | 74 | 48.9 |
| High Lat Winter | −16 | 1011 | 83 | 47.0 |

The carrier pseudorange measurement multipath error is given by $$\sigma_{MULTIPATH} = \frac{\lambda}{2\pi}\sqrt{\frac{1}{2\pi}\int_{-\pi}^{\pi}\tan^{-1}\left(\frac{\alpha \sin(\theta)}{1 + \alpha \cos(\theta)}\right)d\theta}$$

Where

λ is carrier wavelength

α is the product of the reflection coefficient and the code correlation (0 to 1)

Figure 17:
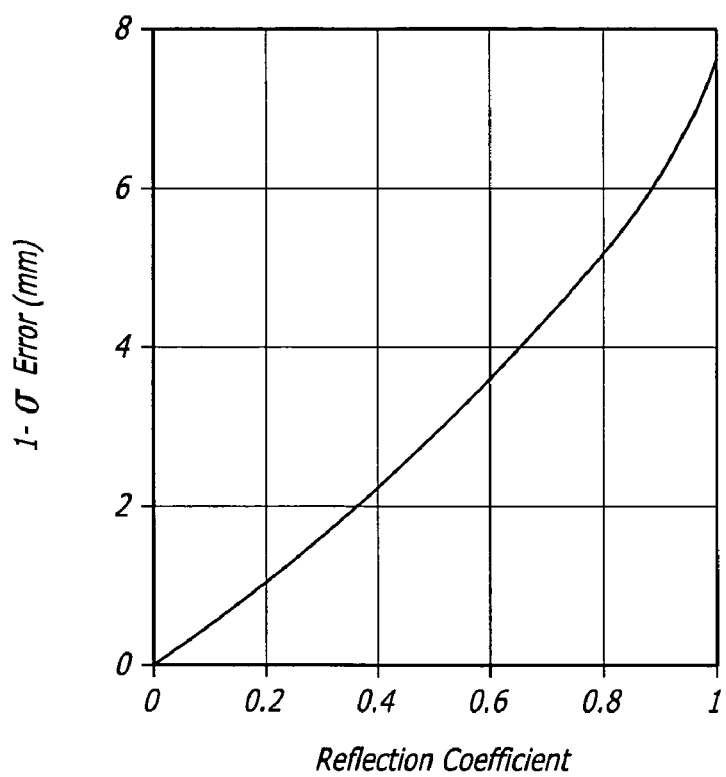
FIG. 17 is a diagram illustrating predicted carrier phase multipath error for a preferred embodiment.

FIG. 17 shows the calculated carrier phase multipath error as a function of the reflection coefficient.

A variety of techniques is available for multipath mitigation, including without limitation: circularly polarized signal; good axial ratio sensor antennas; choke ring sensor antennas; digital processing at sensor; multi-element sensor antennas; RF absorbent sensor ground plane; and higher carrier frequency.

Other error sources are the sensor antenna phase center variation and the sensor position error. Phase center varies as a function of the signal arrival angle at the antenna. At 5.8 GHz variations of 2 to 5 mm are expected. Each sensor antenna is calibrated for phase center variation as a function of signal arrival angle, and these calibration values are subtracted out of the measurements. A 10% modeling error leaves a 0.2 to 0.5 mm residual error.

The sensor positions are preferably measured to submillimeter accuracy using the following procedure:
1) Install the sensors with rigid supports.
2) Switch all of the sensors to calibration mode.
   a) Deactivate the sensor receivers.
   b) Radiate tag like signals from the sensor receivers.
3) Install the reference tag with rigid supports and activate.
4) Place the calibration receiver at several known positions relative to the reference tag.
5) Collect the data at each position.
6) Process data to determine the sensor positions relative to the reference tag.

Other calibration procedures are possible as will be apparent to those skilled in the relevant art.

A carrier pseudorange position error budget is shown in Table 4. A simulation has been used to validate the design.

TABLE 4

Carrier Phase Position Error Budget

| Error Source | 1σ Error |
| --- | --- |
| Measurement | 0.24–0.47 mm |
| Sensor Position Error | 0.3 mm |
| Radio Refractive Index | 0.3 mm |
| Multipath | 0.3–3.0 mm |
| Sensor Antenna Phase Center Variation | 0.2–0.5 mm |
| RSS Error | 0.61–3.11 mm |
| Max 8-Sensor PDOP in Capture Zone/√3 | × 0.96 |
| 1σ Position Error per Axis | 0.56–2.99 mm |

Correlation matched filters are used to obtain time, frequency, and phase measurements. The correlation processing is performed at two levels. First, correlation with the sync field of the tag waveform is used for time and frequency synchronization. This correlation must be performed at frequencies that cover the range of possible Doppler shifts and oscillator offsets. The frequency range is divided into frequency bins, and correlation is performed at the center frequency of each bin. Since all of the tags have the same sync field, the sync correlation detects all of the tags seen by each sensor.

After a tag has been detected and its received frequency bin identified, correlation with the ID field is used to obtain code phase measurements and carrier phase measurements. The code phase measurements are generated by interpolating between the 100 nsec correlation samples to find the peak correlation value. The carrier phase measurements are generated by computing the argument of the interpolated peak correlation value.

FIG. 18 shows the correlation bank functional processing within processor 62 and its correlation bank 1550. Each pair of 10 million sample per second (MSPS) 8-bit in-phase (I) and 8-bit quadrature-phase (Q) samples are input to a FIFO (first in, first out) register 1812. The sample pair is stored as a 16-bit word. FIFO 1812 is 800 words long. At a rate of 62.5-kHz, corresponding to 160 new words being input to the FIFO, the FIFO contents are copied to a 800 word buffer. The 320 words corresponding to the oldest 320 words in the FIFO are copied from the buffer. This copy block is expanded from 320 words to 480 words by padding with 160 words consisting of all zeros. The zero padding is appended to the block next to the newest of the 320 words from the FIFO. The padded block is input to a 480-point complex Fast Fourier Transform (FFT) section 1814. The 8-bit I sample is treated as the real part and the 8-bit Q sample as the imaginary part. The FFT is a fast implementation of the discrete Fourier transform (DFT), which is the discrete version of the continuous time Fourier transform.

The FFT output is multiplied by a reference sync sequence 1818 at multiplier 1816. The 480 word reference sync sequence is precomputed and stored in a memory chip. The same reference sync sequence is used by all sensors. The reference sync sequence is generated by computing the complex FFT of a padded sequence and taking its complex conjugate (i.e. changing the algebraic sign of the Q part). The first 160 words of the padded sequence consist of the 160 words obtained by complex sampling the ideal sync waveform at 10 MSPS. The remaining 320 words consist of zero padding, i.e. words that are all zero.

Complex multiplication is used as follows:

$$I_M = I_F \times I_C - Q_F \times Q_C$$

$$Q_M = I_F \times Q_C + I_F \times Q_C$$

where $I_M$ and $Q_M$ are the multiplier outputs $I_F$ and $Q_F$ are the FFT output $I_C$ and $Q_C$ are the precomputed outputs from the reference memory chip.

The multiplication is performed element by element, i.e. the first word of the FFT output block 1814 is multiplied by the first word of the precomputed reference 1818, the second word by the second word, etc.

The result of the multiplication is a 480 word vector of complex numbers. This vector is input to a 480-point IFFT (inverse FFT) function 1820. The output of the IFFT is another 480 word vector of complex numbers. The magnitude of each of these numbers is computed by taking the square root of the sum of the squares of the I and Q values. The resulting 480 magnitudes are examined for peaks. Each peak corresponds to a tag sync field contained in the 320 words from the buffer, and the location of the peak identifies the start of the tag packet.

Since the sync field is contained within the last 320 words of the buffer, the tag ID field must be fully contained within the buffer. For each correlation peak identified by the sync correlation, 482 words are copied from the buffer corresponding to the predicted location of the 480 word ID field plus one word on each side. The center 480 words of the copy block are correlated (using element by element complex multiplication) at block 1824 with each of the possible tag ID reference sequences. The 480 word reference ID sequences are precomputed and stored in a memory chip such as tag ID waveform EEPROM 1822. The same set of reference ID sequences is used by all sensors. The reference ID sequences are generated by complex sampling an ideal ID waveform at 10 MSPS.

Initially, the number of "possible tag ID reference sequences" is equal to the number of tags in the capture zone. Once a given sensor has detected a packet from tag A at time $T_A$, as measured by the sensor's clock, it knows that the next packet from tag A will arrive at time $T_A+ 4167$ μsec with maximum uncertainty of ±417 μsec due to tag A clock offset (100 ppm) and motion. After the sensor has detected several packets from tag A, it can isolate the arrival of the next packet from tag A to a specific buffer. Then the average number of "possible tag ID reference sequences" is (240×number of tags in capture zone/62,500).

The result of the correlations is one complex value for each possible tag ID reference sequence. The tag ID corresponding to the peak correlation value is used to determine which tag sent the packet. Two additional correlations are computed using the identified tag ID reference sequence, one with the first 480 words of the copy, and the other with the last 480 words of the copy. The magnitude and phase represented by each of these numbers is computed by taking the square root of the sum of the squares of the I and Q values, and by taking the arctangent of the Q value divided by the I value, ATAN(Q/I), respectively. Interpolation of the magnitude values is used to estimate the correlation peak; this value is the code phase measurement. Once the correlation peak has been identified, the phase values are interpolated to the same instant in time; the resulting value is the carrier phase measurement.

A mathematical description of the sync correlation processing follows. The received waveform complex samples are denoted by $s_w(n)$, where n=0 to 319, and the reference waveform complex samples are denoted by $r_w(n)$, where n=0 to 159. Padded complex sample sequences, s and r, are generated as follows:

$s(k)=0$ for $k=0$ to 159 and $s(k)=s_w(k-160)$ for $k=160$ to 479

$r(k)=r_w(k)$ for $k=0$ to 159 and $r(k)=0$ for $k=160$ to 479

Then the processing proceeds as follows:

S is computed as the Fast Fourier Transform (FFT) of s

R is computed as the FFT of r

R* is computed as the conjugate of R

D is computed as the element by element product of S and R*, $D(k)=S(k)\times R*(k)$ The correlation vector, C, is computed as the inverse FFT of D The TI TMS320C6713-200 DSP microcircuit, available from Texas Instruments Incorporated ("TI") of Dallas, Tex., is used in the exemplary embodiment for the sensor processing. Taking advantage of TI's TMS320C67x DSP library and using single precision floating point, the required number of clock cycles for Sync Correlation is shown in Table 5. Since each DSP provides 200 million clocks per second, a total of 7 processors are required for each sensor. The processors are operated in parallel, each processing one sample buffer until each of them has been utilized, by which point the first processor will be free and the cycle repeats. So, each processor processes every $7^{th}$ sample buffer.

TABLE 5

Sensor DSP Sync Correlation Processing Requirements

| Processing Step | Required Cycles |
| --- | --- |
| Compute 512-point complex FFT of buffered samples [2 × n × log$_2$(n) + 42] | 9258 |
| Complex multiply FFT output with the 512-point stored sync reference complex waveform [4 × n + 33] | 2081 |
| Compute complex IFFT of multiply outputs [2 × n × log$_2$(n) + 42] | 9253 |
| Compute magnitude squared of IFFT outputs [2 × n + 22] | 1046 |
| Locate values above threshold [2 × n/3 + 13] | 355 |
| TOTAL | 22,011 |
| | × 62,500 |
| | 1376 Mcps |

Once the sensors are tracking the tags, the tag ID correlation processing consists of three 480-point complex correlations and computation of the interpolated peak value and phase for each packet from each tag. The required number of clock cycles for ID Correlation is shown in Table 6. For 5,000 Tags in the capture zone and 240 packets per second, 37 processors are required.

TABLE 6

Sensor DSP ID Correlation Processing Requirements

| Processing Step | Required Cycles |
| --- | --- |
| 480-point complex correlation with stored sync reference complex waveform [4 × n + 33] | 1953 |
| Factor for correlations with three offset values | × 3 |
| Sub-Total | 5859 |
| Interpolate three offset complex correlation values | 144 |
| Sub-Total | 6003 |
| Packets per Tag times # of Tags | × 240 × 5000 |
| TOTAL | 7,204 Mcps |

Second System Embodiment

A second system embodiment is similar to the first system embodiment, but uses some different techniques. The second system embodiment has generally been determined to be slightly preferred over the first system embodiment and is therefore considered to be a second generation design.

The capture zone is a rectangular parallelepiped with maximum diagonal up to 150 meters. The system captures tag positions anywhere within this capture zone. The system operates with any number of sensors 42 from 4 to 32. The sensors are placed such that the distance between the front of a sensor and the capture zone is between 5 percent and 15 percent of the maximum diagonal of the capture zone.

The buffer zone for each sensor is the volume defined by a plane tangent to the capture zone at its closest point to that sensor and a parallel plane twice the setback distance of that sensor away from the capture zone. Tags are excluded from the buffer zone. The system is capable of capturing 1,000 tags within the capture zone. The system is capable of capturing tags with dynamics of 45 m/s velocity per axis, 45 m/s$^2$ acceleration per axis, and 45 m/s$^3$ jerk per axis.

The tag positions are provided in X, Y, Z coordinates relative to the location of fixed reference tag 50. The orientation of the coordinate frame is determined during calibration. The tag position outputs have no more than 0.1 second latency. Positions for each tag are output at a rate of N times per second, where N is selectable from the set {1, 2, 3, 4, 5, 6, 8, 10, 12, 15, 16, 20, 24, 30, 40, 48, 60, 80, 120, and 240}.

For any two tags A and B, which may be the same tag, and at any two times $t_1$ and $t_2$, which may be the same time, the 1-σ per axis error in the reported position of tag A at time $t_1$ relative to the reported position of tag B at time $t_2$ does not exceed the following; provided that the position dilution of precision (PDOP) of each of the reference tag 50, the A tag, and the B tag calculated using only those sensors with clear line-of-sight to the tags, does not exceed 1.73:

$$\epsilon = 1 \text{ mm} + F_V(V_{AB}) + F_T(t_2 - t_1) + F_D(\delta_{AB})$$

where $V_{AB} = \text{MAX}[V_A(t_1), V_A(t_2), V_B(t_1), V_B(t_2)]$
$V_X(t_k)$ is the actual velocity of Tag X at time $t_k$
$\delta_{AB} = |P_A(t_1) - P_B(t_2)|$
$P_X(t_k)$ is the actual position vector of Tag X at time $t_k$
If v<1 m/s then $F_V(v)=0$ mm, else $F_V(v)=1$ mm×v/(1 m/s)
If t<21,600 sec then $F_T(t)=0$ mm, else $F_T(t)=1$ mm×t/(21,600 s)
If d<3 m then $F_D(d)=0$ mm, else $F_D(d)=1$ mm×d/(3 m)

The tag position outputs have a precision of 0.1 mm, or better.

The system outputs are provided on a 1000Base-T interface. They are broadcast using UDP to port 3030 on IP multicast address 214.0.0.2. One UDP packet is generated for each tag at the selected output rate with the format shown in Table 7.

TABLE 7

Output Packet Format

| Field | # of Bytes | Format/Coding | Description |
|---|---|---|---|
| Time_Code | 8 | IEEE 64-bit integer, Microsoft DateTime format | Reference time for position |
| Tag_ID | 8 | 8 character ASCII hex string | 32-bit Tag ID |
| X_Position | 8 | IEEE double precision floating point | Relative X position |
| Y_Position | 8 | IEEE double precision floating point | Relative Y position |
| Z_Position | 8 | IEEE double precision floating point | Relative Z position |
| Quality_Factor | 2 | IEEE 16-bit integer | Position quality |

The tags transmit in the 5725 MHz to 5875 MHz band. It is divided into 15 channels with center frequencies of 5730+n×10 MHz, n=0, 1, . . . , 14. Up to 1,000 tags are deployed in each channel, for a total capacity of 15,000 tags in the band.

The tags transmit 400-bit packets. Each tag designed to operate on a given frequency channel is assigned a unique 400-bit pattern obtained as a substring of a long maximal length sequence (PN-sequence). To accommodate 1,000 tags, a minimum sequence length of 400,000 bits is required. This is provided by a SSRG with 19 or more stages and appropriate feedback taps. Alternatively, a family of codes with good cross-correlation properties, such as Gold codes, could be used.

FIG. 19 shows the simple shift register generator used within the tag. The 1,000 400-bit patterns are generated from a SSRG with maximal length feedback polynomial $x^{19} + x^5 + x^2 + x$ and initial condition 07FFFF hex (1111111111111111111 binary). Note that since $2^{19} - 1 = 524$, 287 is a Mersenne prime, all 19 degree irreducible polynomials over $Z_2$ result in maximal length sequences. Also, any initial condition, except all zeros, results in a maximal length sequence. The SSRG exclusive OR's the bits in the $19^{th}$, $5^{th}$, $2^{nd}$, and $1^{st}$ stages to generate an input to the $1^{st}$ stage. The bits are then shifted one stage to the left. The bit in the leftmost stage, the $19^{th}$, is output. The bit pattern for tag k is bits 400×k through 400×k+399 of the output sequence, for k=0, 1, . . . , 999.

The tag transmission signal modulation rate is 10 Mbps. Thus each time its 400-bit packet is transmitted, a tag bursts for 40 μsec. The burst repetition rate is 50-Hz, so the time between bursts is approximately 20,000 μsec. Thus each tag has a 0.2% transmit duty cycle. There is intentionally no synchronization of the transmission clocks between the tags. This insures that the overlap between bursts from different tags, as seen at each of the sensors, is minimized.

Figure 20:
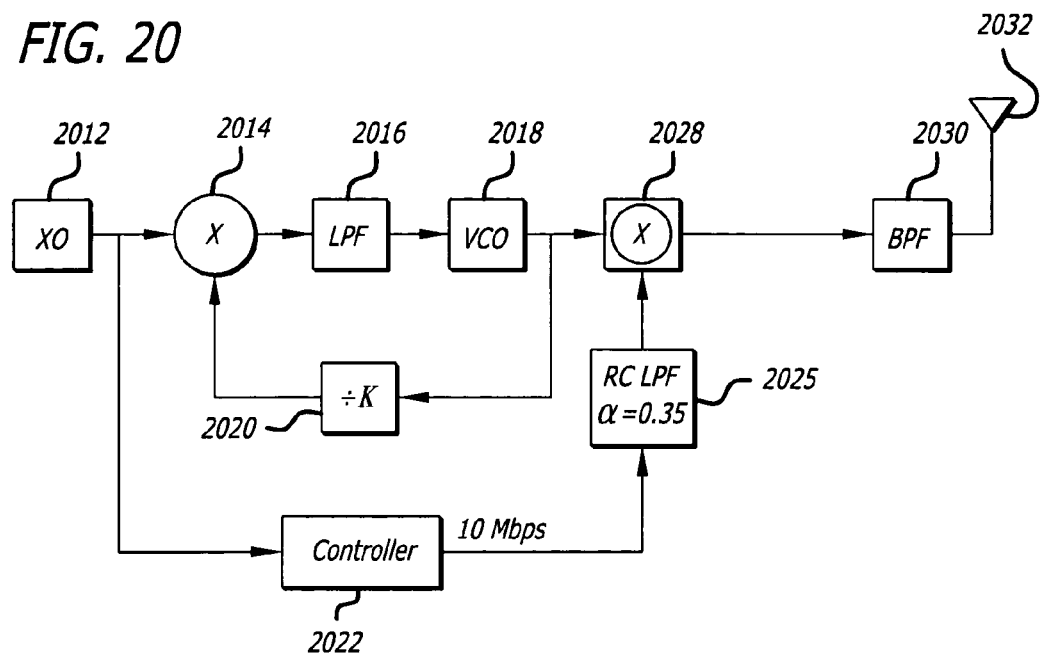
FIG. 20 is a functional block diagram of a tag according to a third tag embodiment used in the second system embodiment.

FIG. 20 is a functional block diagram of the tag. The 10-MHz crystal oscillator (XO) 2012 generates a reference clock. A phase-lock-loop (PLL), consisting of a phase/frequency detector, low-pass filter (LPF) 2016, and divider 2020, is used to stabilize the output of a nominal 5.8 GHz voltage controlled oscillator (VCO) 2018 by locking it to the XO reference clock. The divide ratio is set to one of 573, 574, . . . , 587, corresponding to the desired frequency channel. The stabilized VCO output is BPSK modulated by modulator 2028 The modulating signal is generated by pulse shaping the controller 2022 output waveform with a raised cosine (RC) LPF 2025 with roll-off factor α=0.35. The controller 2022 outputs the tag's 400-bit sequence at 10 Mbps, 50 times per second.

Figure 21:
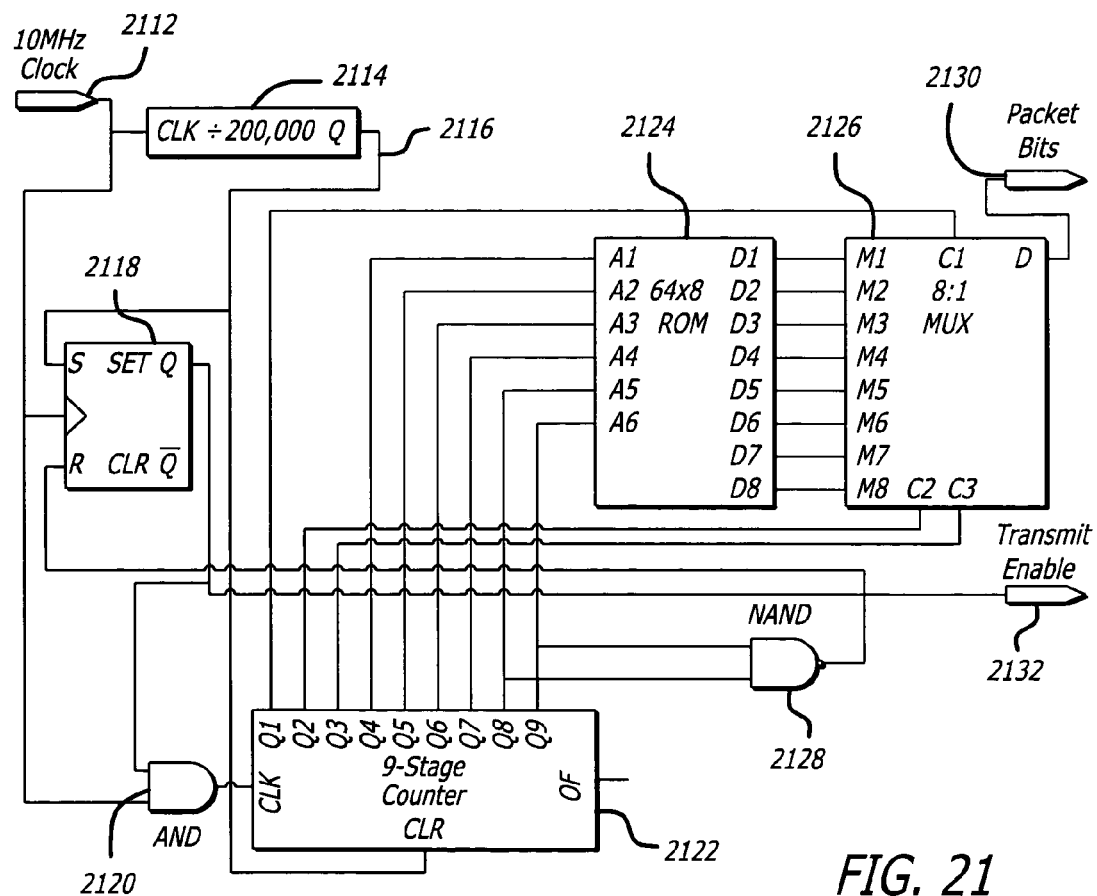
FIG. 21 is a schematic diagram of an exemplary tag controller circuit according to a third tag controller embodiment used in the second system embodiment.

FIG. 21 is a schematic diagram of one possible tag controller circuit. The 10-MHz tag clock 2112 is divided by 200,000 at divider 2114 to generate the 50 Hz packet clock 2116. This packet clock sets the enable flip-flop 2118 and resets a 9-stage (divide by 512) counter 2122. The enable flip-flop state is used to gate the 10 MHz clock and to enable the transmitter via transmit enable signal 2132. The gated 10 MHz clock is used to clock the counter 2122. When counter 2122 reaches the 400-state, the enable flip-flop 2118 is reset, disabling the gated clock, stopping the counter 2122, and disabling the transmitter. The seven MSB's of the counter state are used to address a 64×8 ROM 2124, which contains the 400 bits of packet data. The addressed 8-bit ROM data is applied to an 8-to-1 MUX 2126. The three LSB's of the counter state are used to select the MUX output, which provides the controller output 2130.

Figure 27:
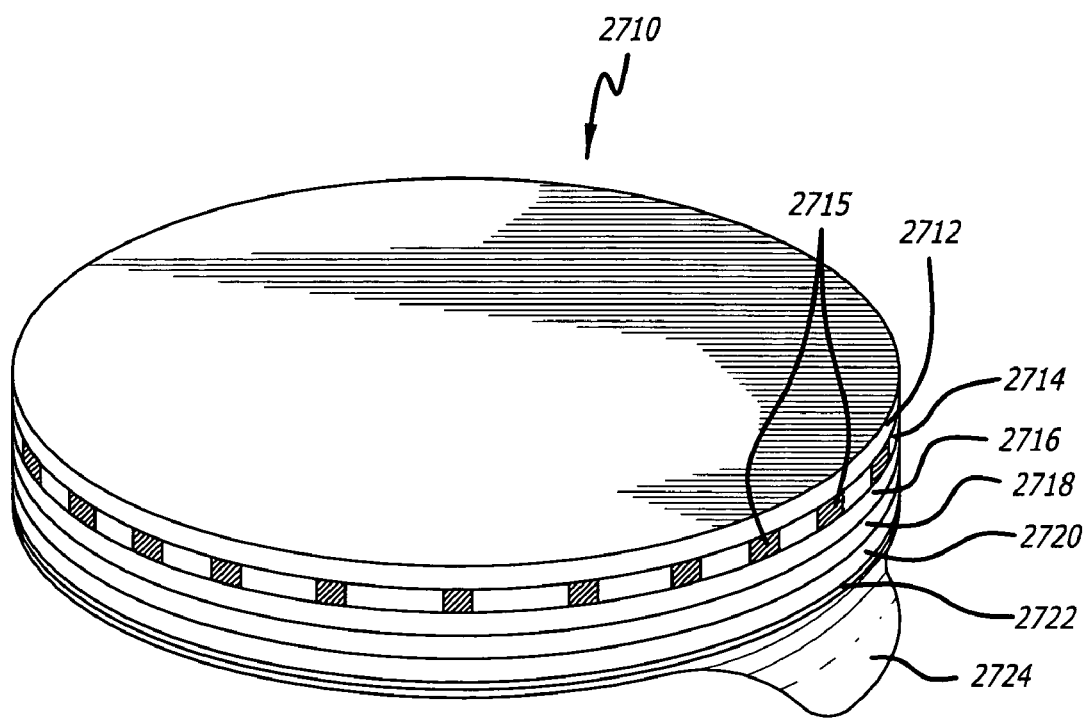
FIG. 27 is a side perspective view of a patch tag according to one aspect of the present invention.

FIG. 27 is a side perspective view of a patch tag according to one possible patch tag embodiment. Tag 2710 is packaged as a stick-on patch, similar to those used for sustained drug release in humans. They are flat, flexible, approximately 40 mm in diameter, and comprise multiple layers. Those layers include a top protective layer 2712, an antenna layer 2714 including an antenna 2715 which may be a film or printed antenna, a circuit die layer 2716 containing an ASIC circuit die or other circuitry, a battery layer 2718 containing a battery such as a printed battery, a protective layer 2720, and an adhesive layer 2722. Removable layer 2724 may be a peelable paper layer or film layer covering and protecting the adhesive until the tag is ready to be used. When the device is ready to be used the user peels away removable layer 2724 to expose the adhesive which then is used to attach tag 2710 to human skin, clothing, or some other surface. Removal of this backing 2724 also activates tag 2710 by closing the battery connection. In one embodiment the battery layer 2718 is a printed open cell battery providing 31 mA/hr storage and 63 mA peak pulse discharge current at 1.5 VDC. The die on circuit die layer 2716 may be a SiGe BiCMOS ASIC device incorporating both the RF and digital tag functions. With their 0.2% duty cycles, each tag 2710 can operate at the 63 mA peak pulse discharge current for 10 days.

Removal of removable layer 2724 can activate tag 2710 in any of a number of different ways. Removable layer 2724 can include a tab extending inwardly from the plane of patch antenna 2710 and disposed between two spring loaded battery contacts, such that removing removable layer 2724 causes the tab to be withdrawn from between the contacts thus allowing the battery circuit to close and provide power to the device or otherwise activate it. This would be a normally open arrangement. A normally closed arrangement could alternatively be used, in which removable layer 2724 has a conductive portion which normally covers and therefore closes two electrical contacts through which a very low amperage current flows. When the removable layer is removed, the contacts are opened causing the device to sense the now-open circuit and respond by powering the remainder of the device and initiating transmissions.

Other mechanisms for activating the device when it is ready to be used are possible. Removing removable layer 2724 having at least one opaque portion could expose a photodiode or other photoreceptor, causing the device to turn on. Removing the removable layer 2724 could also expose an oxygen sensor to the atmosphere causing the device to turn on. The tag 2710 could come wrapped in a wrapper such as a foil wrapper, with removal of the wrapper causing a sensor on tag 2710 to be exposed to light, oxygen, or other environmental conditions thus activating tag 2710. Other methods of sensing are well known and could be used.

Tag 2710 can also provide visual, audio, or other feedback to indicate that it has been activated and to provide certain status information. For example, upon activation of the device a small light emitting diode (LED) could flash several times, or the device could beep several times, indicating that the device is now transmitting. Status information could also be provided in various ways. The LED flashing pattern or beep pattern could indicate that built in self test (BIST) has passed or failed, battery fully charged or low, or other conditions. BIST results and other diagnostic and status information could also be transmitted through the RF transmitter upon initial activation and/or periodically.

Figure 22:
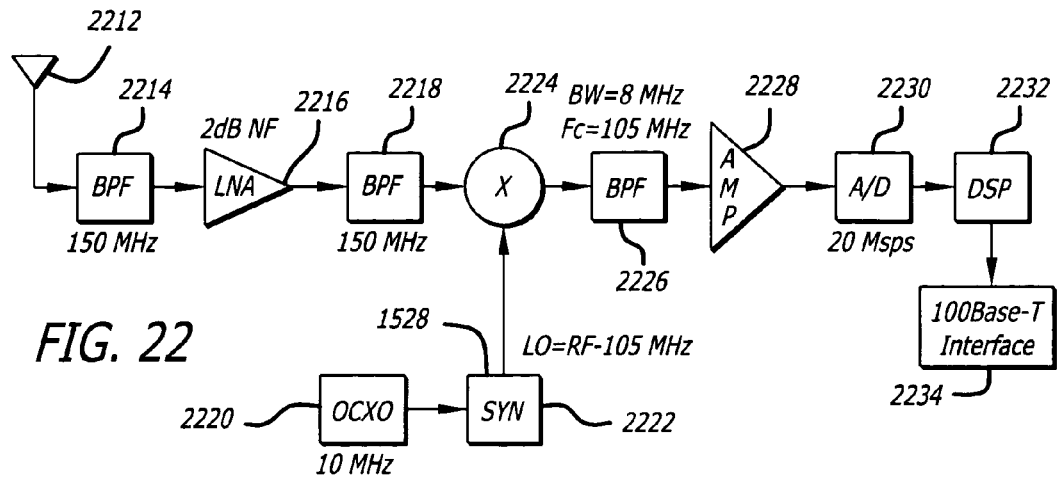
FIG. 22 is a functional block diagram of a sensor according to the second system embodiment.

FIG. 22 is a functional block diagram of a sensor 42 according to one embodiment. The sensor receives the 5.8-GHz signals via receive antenna 2212 from the tags, bandpass filters the signals at bandpass filter 2214 to remove interference, and low noise amplifies them at amplifier 2216 to set the receiver noise floor. The low noise amplified signals are then bandpass filtered again at band pass filter 2218 to limit the noise power, and downconverted at muliplier 2224 to a 105-MHz IF signal. The IF signal is bandpass filtered at BPF block 2226 with an 8-MHz bandwidth, amplified at amplifier 2228, and sampled and quantized at A-to-D converter 2230 at 20 Msps. The sample rate, $F_S$, and IF frequency, $F_{IF}$, are selected such that $4 \times F_{IF} = (2k+1) \times F_S$, for some integer k. With $F_{IF}$=105-MHz and $F_S$=20 Msps, k=10 and (2k+1)=21. The digital samples represent alternating in-phase (I) and quadrature-phase (Q) samples as follows I, Q, −I, −Q. These samples are input to DSP 2232 where they are combined into complex samples and the alternating signs are corrected. DSP 2232 implements a correlation bank to determine parameters that are converted into the most likely tag ID, code phase, and carrier phase. These estimates are then transferred to the processing system via a 100Base-T Ethernet interface 2234.

Figure 23:
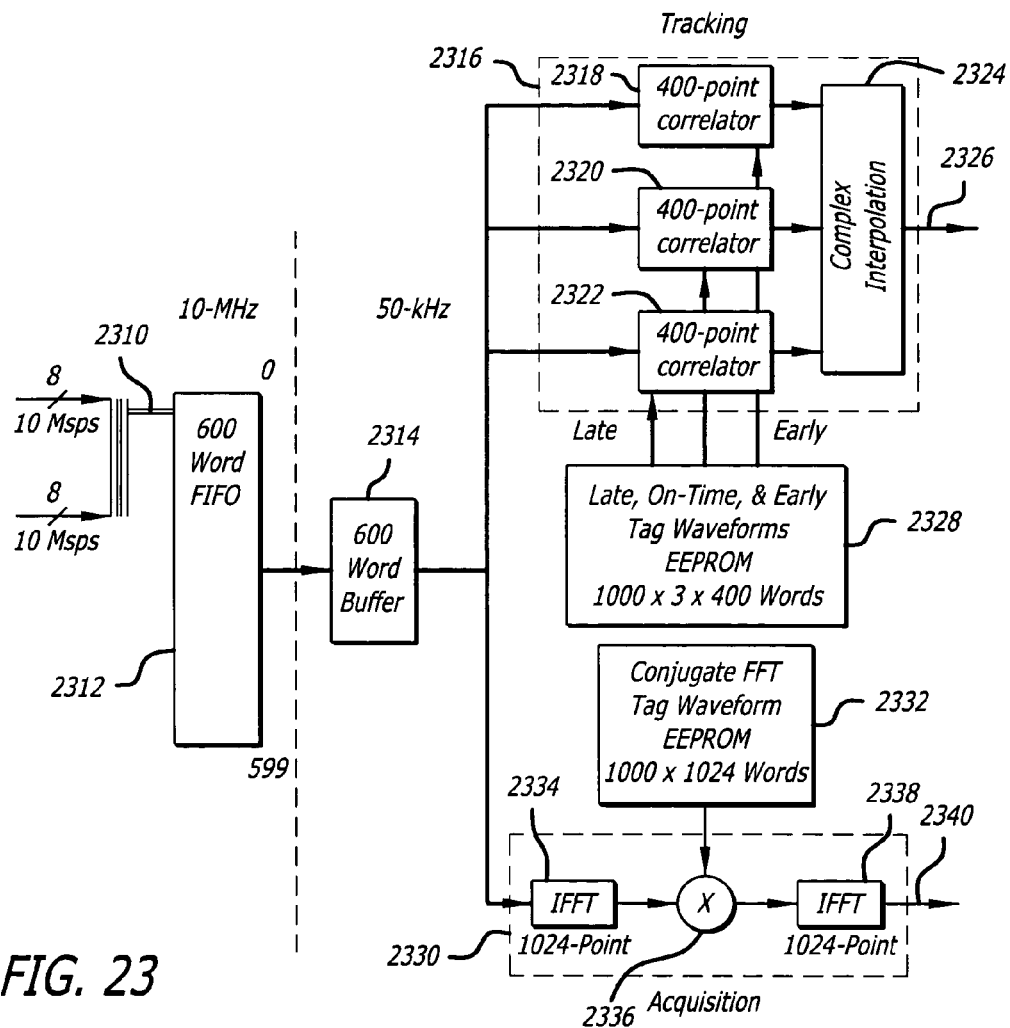
FIG. 23 is a sensor DSP processing functional block diagram according to the second system embodiment.

FIG. 23 is a sensor DSP processing functional block diagram. The 10 Msps complex samples 2310 are input to a FIFO register 2312. Each sample is stored as a 16-bit word. The FIFO is 600 words long. At a rate of 50-kHz, corresponding to 200 new words being input to the FIFO, the FIFO contents are copied to a 600 word buffer 2314. The buffer data is processed according to the sensor mode, Acquisition or Tracking.

In Acquisition Mode, the buffer is expanded from 600 words to 1024 words by padding with 424 words consisting of all zeros. The zero padding is appended to the block next to the newest of the words from FIFO 2312. The padded buffer is input to a 1024-point complex FFT section 2334.

The FFT output is multiplied at multipliers 2336 in turn by each of the 1000 reference ID sequences. The 1024 word reference ID sequences are precomputed and stored in a memory chip. The same reference ID sequences are used by all sensors. The reference ID sequences are generated by computing the complex FFT of a padded sequence and taking its complex conjugate (i.e. changing the algebraic sign of the Q part). The first 400 words of each padded sequence consist of the 400 words obtained by complex sampling the ideal tag waveforms at 10 Msps. These ideal tag waveforms include models of all tag components, such as filters, that may impact the transmit waveform, such that the stored waveforms approximate the idealized tag identification code waveforms as they would actually be received at the sensors. The remaining 624 words consist of zero padding, i.e. words that are all zero. The results are stored in EEPROM 2332.

Complex multiplication is used as follows:

$$I_M = I_F \times I_C - Q_F \times Q_C$$

$$Q_M = I_F \times Q_C + I_F \times Q_C$$

where $I_M$ and $Q_M$ are the multiplier outputs $I_F$ and $Q_F$ are the FFT output $I_C$ and $Q_C$ are the precomputed outputs from the reference memory chip The multiplication is performed element by element, i.e. the first word of the FFT output block is multiplied by the first word of the precomputed reference, the second word by the second word, etc.

The result of the multiplication is a 1024 word vector of complex numbers. This vector is input to a 1024-point IFFT (inverse FFT) section 2338. The output 2340 of the IFFT is another 1024 word vector of complex numbers. The magnitude of each of these numbers is computed by taking the square root of the sum of the squares of the I and Q values. The peak value, and corresponding index, is determined for each of the 1000 Tag reference sequences. If a peak exceeds a threshold, the corresponding Tag has been received.

The magnitude and phase represented by each of these peak indices is computed by taking the square root of the sum of the squares of the I and Q values, and by taking the arctangent of the Q value divided by the I value, ATAN(Q/I), respectively. Interpolation of the magnitude values is used to estimate the correlation peak; this value is the code phase measurement. The code phase measurement provides a course position estimate. Once the correlation peak has been identified, the phase values are interpolated to the same instant in time; the resulting value is the carrier phase measurement. The carrier phase measurement provides a fine position estimate within the bounds of the code phase measurement.

A mathematical description of the Acquisition Mode processing follows. The received waveform samples are denoted by $s_w(n)$, where n=0 to 599, and the reference waveform samples are denoted by $r_w(n)$, where n=0 to 399. Padded sample sequences, s and r, are generated as follows:

$s(k)=0$ for $k=0$ to 423 and $s(k)=s_w(k-424)$ for $k=424$ to 1023

$r(k)=r_w(k)$ for $k=0$ to 399 and $r(k)=0$ for $k=400$ to 1023

Then the processing proceeds as follows:
  S is computed as the Fast Fourier Transform (FFT) of s
  R is computed as the FFT of r
  R* is computed as the conjugate of R
  D is computed as the element by element product of S and R*, $D(k)=S(k)\times R^*(k)$
  The correlation vector, C, is computed as the inverse FFT of D In Track Mode, for each packet expected to be in a buffer, the 400-words associated with that packet are correlated with three 400-word reference waveforms pre-stored in the sensor. The three reference waveforms correspond to the on-time packet and the packet shifted ½ bit early and ½ bit late. The correlations are computed as complex vector dot products between the 400-word vector extracted from the buffer and the on-time, early, and late pre-stored reference waveforms. Thus the Track Mode processing consists of three 400-point complex vector dot products and computation of the interpolated peak value and phase for each packet from each tag.

The TI TMS320C6713-200 DSP may be used for sensor processing. Taking advantage of TI's TMS320C67x DSP library and using single precision floating point, the anticipated required number of clock cycles is shown in Table 8, for 500 tags in the capture zone. Since each DSP chip provides 200 million clocks per second, a single chip is required for each sensor.

TABLE 8

Sensor DSP Tracking Processing Requirements

| Processing Step | Required Cycles |
| --- | --- |
| 400-point complex correlation with stored sync reference complex waveform [4 × n + 33] | 1633 |
| Factor for correlations with three offset values | × 3 |
| Sub-Total | 4899 |
| Interpolate three offset complex correlation values | 144 |
| Sub-Total | 5043 |
| Packets per Tag times # of Tags | × 50 × 500 |
| TOTAL | 126 Mcps |

Figure 24:
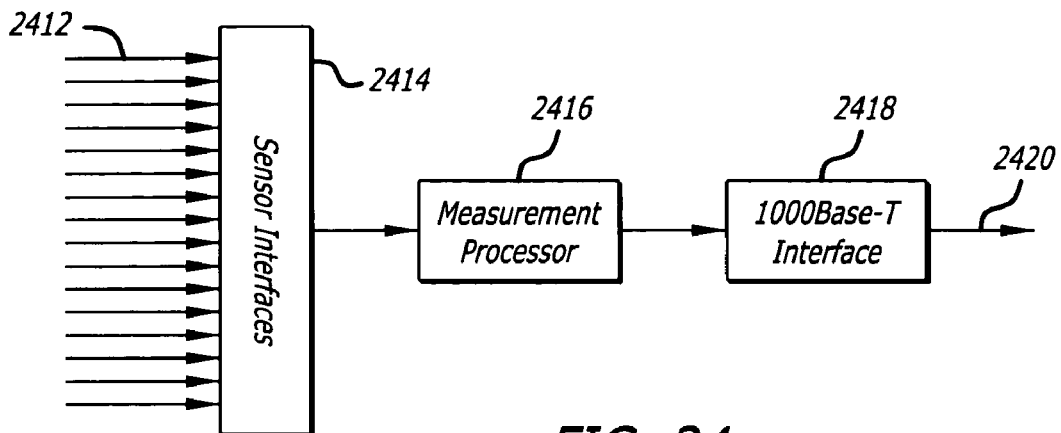
FIG. 24 is a functional block diagram of the processor for processing received tag signals according to the second system embodiment.

FIG. 24 is a functional block diagram of the processor for processing received tag signals according to this embodiment. The data 2412 on the 100Base-T interfaces from the various sensors via sensor interfaces 2414 is input to the measurement processor 2416, which converts the code and carrier phases into position estimates. The estimates 2420 are output via a 1000Base-T Gigabit Ethernet interface 2418.

The processor uses the code and carrier pseudorange measurements from the sensors to determine the tag positions at the sampling instants. All positions are relative to the reference tag. The code pseudorange measurements are processed as described in the section entitled Processing Algorithms to provide a rough position estimate. This rough estimate is used to bound the ambiguity search, and carrier pseudorange measurements are processed to obtain the final position estimate.

Figure 25:
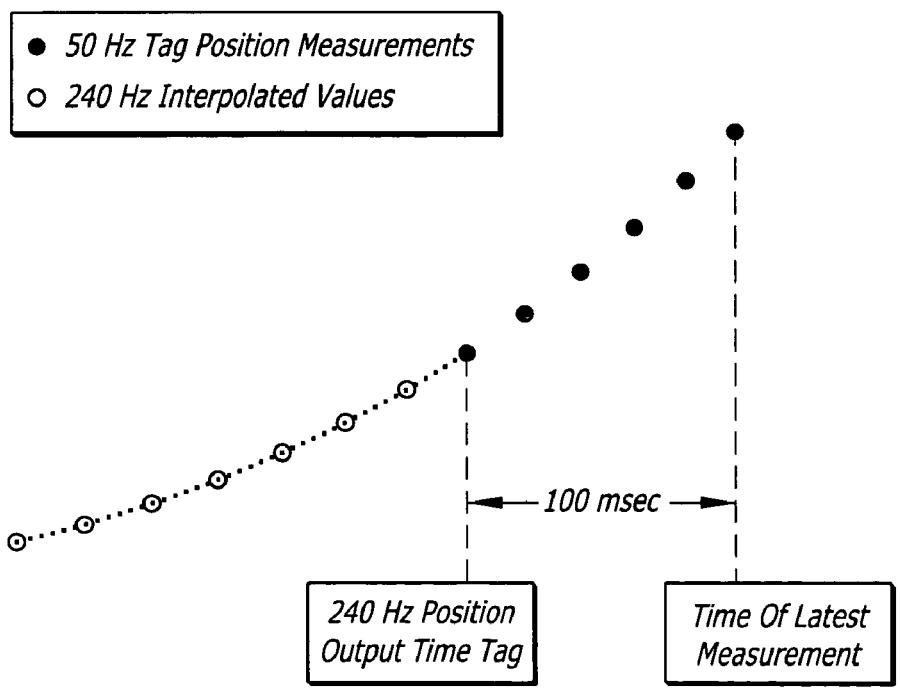
FIG. 25 is a tag position resampling plot.

The processor resamples the tag position measurements to match the required position output rate (1 Hz to 240 Hz), the processor takes advantage of the allowable 100 msec latency to smooth the positions as shown in FIG. 25. Even if the measurement rate and output rate were identical, resampling would be desirable since the tag transmit times are unsynchronized.

Figure 26:
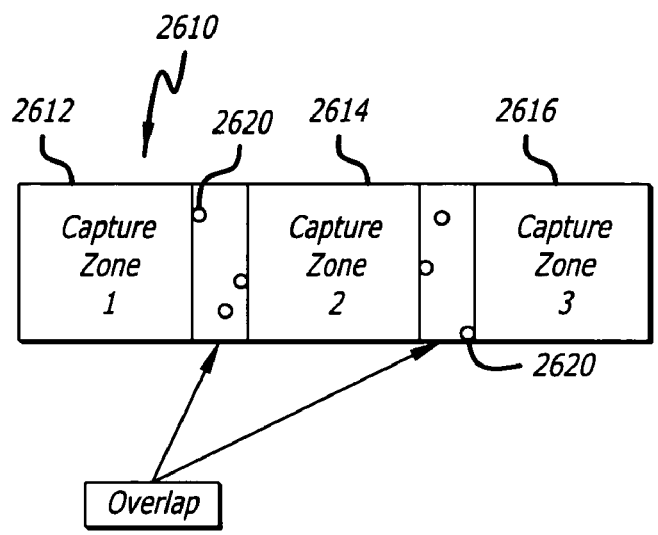
FIG. 26 illustrates how the system can be used to create an extended capture zone by overlapping individual captures zones.

FIG. 26 illustrates how the techniques described above can be used to create an extended capture zone. Extended capture zone 2610 includes a plurality of separate but overlapping capture zones 2612, 2614, and 2616. Sensors 2620 are placed between the individual capture zones. Sensors 2620 in the overlapping capture zone spaces are preferably not colinear or nearly colinear.

APPLICATIONS

The basic system described above can be used for a larger number of applications including motion capture for video games, television, cartoons, commercials, music videos, feature films, digital extras, digital stunts, and digital crowds. This invention provides many of the advantages of optical systems (extremely accurate, large number of markers, easy to change marker configuration, performers not constrained by cables, and large performance areas) without various disadvantages (extensive post-processing, expensive hardware, inability to capture occluded markers, and the need for a controlled environment).

The motion capture tracking software receives the marker tag coordinates from the processor and processes them to reduce data noise as necessary. This reduction can be carried out by different methods, such as averaging various adjacent samples, limiting the maximum variations on the coordinates, or predicting positions based on history. Other noise reduction algorithms can be used for this purpose. After the reduction, the motion capture tracking software rebuilds unavailable data. This reconstruction is done by analyzing and completing existing trajectories.

The biomechanical solver program takes the motion capture tracking software output data and builds the hierarchical structure that is used to recreate the subject's motion. This process combines the positions of up to 3 marker tags to recreate the rotations of a discrete part about its parent. The resulting hierarchical chain consists of a single global translation and a series of rotations, such as, in the case of a human body, rotations for every limb about a local axis. The system then outputs the data generated by the biomechanical solver program.

RF Match Moving

The system can be used for match moving applications. Match moving is the automatic registration of 3-D virtual images with 2-D film or video images. The virtual camera from which the computer generated (CG) objects are viewed must closely match the actual camera position, rotation, focal length, and aperture. This can be achieved by using a motion control camera, which limits the directors' flexibility, or by tracking the camera in real-time. In both cases, the camera settings must be recorded.

A minimum of 4 stationary reference tags are placed in the capture zone to establish the reference coordinate system. It is preferred that the tags are not coplanar or nearly coplanar. The angular accuracy is roughly equal to 11° divided by the separation distance between the reference tags expressed in centimeters. Thus for a 300 cm, 10 foot, separation, an angular accuracy of better than 0.050 can be achieved.

FIG. 2 illustrates a camera having tags on it for the purpose of match moving. A minimum of 3 marker tags are attached to each camera to track its spatial position and rotation. It is preferred that the tags are not collinear or nearly collinear. The angular accuracy is roughly equal to 11° divided by the separation distance between the marker tags expressed in centimeters. Thus for a 30 cm, 1 foot, separation, an angular accuracy of better than 0.5° can be achieved.

Stationary marker tags are placed in the capture zone to define coordinate frames for CG objects. Three tags are selected to lock the coordinate frame of each object. Additionally, CG objects can be locked to non-stationary "live" objects in the capture zone that have a minimum of 3 marker tags attached. In both cases, it is preferred that the three tags are not collinear or nearly collinear.

Once the required reference tags and marker tags have been placed in the capture zone, attached to the cameras, and attached to desired live objects, the CG objects are combined with live action video as follows:

Live action is recorded using a video camera.
All marker tags in the capture zone are tracked.
The focal length and aperture settings for the camera are recorded.
The RF Position Tracking System time code and the camera time code are recorded.
Each CG object is assigned 3 Tags for coordinate frame lock.
Each CG object is generated as it would have been captured by the video camera if it had been a "live" object.
All of the CG objects are combined with the "live" video and the composite rendered for display.

Stationary tags which are visible to the camera can be used to correct camera lens distortions and other effects.

Amusement Park/Mall/Airport/Gathering Area Asset Tracking System

The system can be used for asset tracking. Asset tracking captures the location and movement of people or other objects in any area such as an amusement park, mall, airport, or other indoor or outdoor location where there is likely to be a high density of people, animals, or other moving or static objects. Examples of its use include the ability to find lost children at an amusement park, and the ability to track the path used by people once entering an airport. A marker tag is attached to each asset. For children, the marker tag could be applied via a wristband or underneath clothing such that it would be unlikely that the child could or would remove the marker tag by himself The system can find any one marker tag and/or trace its movement over time. Using the system, thousands of children could be instantaneously and simultaneously tracked with pinpoint accuracy throughout an amusement park or similar gathering. If an accompanying parent also carries a marker tag, the child and parent marker tags could be registered as a pair via scanning such that if the child were to leave the park without the parent close by, an alarm would sound and/or security would otherwise be alerted. The child would not be allowed to leave the parking lot or other outer perimeter until the possible abduction situation was resolved.

In the asset tracking system, the asset tracking software receives the marker tag coordinates from the processor and further processes them to reduce data noise as necessary. This reduction can be carried out by different methods, such as averaging various adjacent samples, limiting the maximum variations on the coordinates, or predicting positions based on history. Other noise reduction algorithms can be used for this purpose. After the reduction, the asset capture tracking software rebuilds unavailable data. This reconstruction is done by analyzing and completing existing trajectories.

The tracing and capture program takes the asset tracking software output data and builds the hierarchical structure that is used to recreate the subject's motion and location at any given time. This data can be combined with maps, blueprints, GIS or other software that provides building/structure/environment detail. This combined data can then be monitored on computer systems and also streamed to PDA's and public kiosks.

Golf Swing Analyzing Tool for Driving Ranges

Applications for the position tracking system include the ability to capture the golf swing of any individual for replay and analysis. The system can be set up at a driving range where motion data is captured through the use of marker tags and sensors. The data is processed in real-time and displayed with high precision in realistic 3-D animation. This animation can then be viewed and manipulated in unlimited ways, providing insight and analyses into the individual's golf swing. The datasets from each swing can be saved and compared to professional golf swings, previous golf swings, etc. Body part movements, such as the rotation of one body part in relation to another, could be viewed in isolation. The subject could be represented by a series of wire frames, also providing focused analysis. In addition, datasets could be input into video games where the individual can use his/her actual swing and image in the game. Because the number of marker tags would be relatively small for such applications, the marker tag burst rate and hence the effective capture rate could be increased to well above 30 frames per second, thus capturing the motion with what would amount to a frame rate of much faster than that of standard video recording apparatus. Because the dataset would be digital by nature, a computer system could provide instant quantitative and qualitative analysis. For example, immediately after a golf swing the processing system could inform the golfer that he is over rotating his wrist by 10% just before ball impact, and provide a slow motion illustration of his wrist versus those of model golfer.

Similarly, the system could be used to capture, analyze, and manipulate other sporting activity movements such as running strides, pitching motions, pole vaulting, and other activities.

INDUSTRIAL APPLICATIONS

In addition to the asset tracking discussed above, the system could also be used to track and analyze non-human movements, such as industrial processes including high speed industrial product manufacturing process in which precision coordinated movements of different parts at high speeds is required. The system would provide various advantages over high speed filming of industrial processes which has been used in the past to analyze such processes, including the ability to provide accurate distance, speed, and rotational measurements throughout the recorded sequence.

Capturing Motion Data from Film Production or Sporting Events for Use in Video Game Production The precision tracking system can be used to capture motion for visual effects on film or television. The same datasets created on the film can be used for the development of lifelike motion mimicking those of the actors for video games. This data can be used with video game animation software to re-create actual body movement and interactions from the filming of the movie for the video game.

The precision tracking system can be used to capture the motion of athletes, key personnel and objects during a live sporting event such as basketball or football games, and provide position data which can then be used to create 3-D animation for video games. In addition, game datasets captured by the precision tracking system can be downloaded and incorporated into existing video games for enhanced player experiences. This data is used with video game animation software to re-create actual body movement and interactions from the sporting event for the video game.

Tracking Entire Sporting Events to Enhance Sports Broadcasts

The system could also be used to capture all the elements involved in a sporting event, including players, umpires/referees/field judges, players, equipment (balls, bats, clubs, etc.), and static objects important to the game in real-time. The motion data gathered by sensors could then be used to recreate live action using 3-D animation. This animation could then be used to provide accurate replay, analysis, virtual advertising, virtual imaging and interactive activities such as spectator controlled viewpoints via the Internet.

Multiple marker tags could be attached on players and other objects to be tracked. Software would rebuild the images and merge them with animation to display an exact reproduction of the action that could be manipulated by an operator and broadcast on television or streamed online.

Sports Performance Analysis and Reply Tool

Applications for the position tracking system include the ability to capture, monitor and analyze the performance of athletes in real-time. During a performance, motion data is captured through the use of marker tags and sensors. This data is processed in real-time and displayed with high precision in photo-real 3-D animation. This animation can then be viewed and manipulated in unlimited ways, providing insight and analyses to an athlete's performance. Datasets and animated sequences can be used for decision making, for monitoring the medical condition of athletes, and for training purposes.

Multiple marker tags could be attached on players and other objects to be tracked. Software would rebuild the images and merge them with animation to display an exact reproduction of the action that can be manipulated in unlimited ways by an operator.

Full Body Video Game Controller

The precision tracking system can be used to capture motion of a video game player that will, in real-time, control the action of a video game in the same way as existing handheld controllers do currently. Players play the video game with marker tags attached to their bodies while sensors capture their motion data and send it to the video game consol for processing and display. The player watches as his/her body movements are recreated on the screen.

Multiple marker tags would be attached on key points of the players' bodies such as wrists, ankles, and waists. The video game console would translate and render the action much like it would with existing video game controllers.

As used herein, the term "radio frequency" (RF) is intended to encompass the spectral range from about 10 KHz to about 300 GHz, which includes microwaves.

In the preceding discussion the reference tag has been characterized as fixed or stationary. It will be appreciated that the reference tag(s) need not be strictly stationary or fixed. Provided that the position of the reference tag can be determined, the reference tag will be understood to be fixed or stationary within the meaning of the invention. For example, if a reference tag were to be moved by a known or knowable distance and in a known or knowable direction, the distance and direction could be made known to, or otherwise determined by, the processing system. The processing system could then simply take that known movement into account and continue processing the tag pseudorange measurements accordingly to determine the correct relative and/or absolute positions of the marker tags being tracked. It is intended that the claims presented herein will cover such an insubstantial change to the preferred embodiment. Accordingly, the words "stationary" or "fixed" as used herein when referring to a reference tag are to be understood to cover not only absolutely stationary with respect to the earth's surface, but also located at a determinable position with respect to a desirable coordinate system even though that determinable position may move from one moment to the next.

It will be also appreciated that the term "present invention" as used herein should not be construed to mean that only a single invention having a single essential element or group of elements is presented. Similarly, it will also be appreciated that the term "present invention" encompasses a number of separate innovations which can each be considered separate inventions. Although the present invention has thus been described in detail with regard to the preferred embodiments and drawings thereof, it should be apparent to those skilled in the art that various adaptations and modifications of the present invention may be accomplished without departing from the spirit and the scope of the invention. For example, other hardware architectures and microcircuit technologies can be used; variations on the algorithms can be used; different memory types can be used; different bit lengths, code words, and code types can be used; different frequencies, frequency plans, modulation types, and transmission and reception techniques can be used. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A motion capture system comprising:
at least four stationary radio frequency receivers around a defined area;
a first radio frequency transmitter disposed at an arbitrary position relative to the receivers;
a plurality of radio frequency transmitters affixed to at least one movable object within the vicinity of the defined area;
the receivers receiving radio frequency signals transmitted by the transmitters; and
a processing system for processing the signals received from the transmitters to determine positional information regarding the movable object within the vicinity of the defined area, the processing system using signals received from the first transmitter as a reference for determining positions of the transmitters affixed to the movable object relative to the position of the first transmitter at said arbitrary position.

2. The system of claim 1 further comprising means for automatically determining said first transmitter position relative to the receivers.

3. The system of claim 1 wherein the stationary receivers have respective receiver clocks, and the stationary receivers do not have circuitry which synchronizes their receiver clocks from one stationary receiver to another.

4. The system of claim 1 wherein the movable object is a motion picture camera, and wherein the plurality of transmitters affixed thereto comprise at least 3 transmitters disposed at positions on the camera sufficient to determine pitch, yaw, and roll of the camera.

5. The system of claim 4 wherein the motion picture camera is a hand held motion picture camera.

6. The system of claim 1 wherein at least one of the transmitters comprises a flexible patch having an adhesive layer on the transmitter covered by the backing layer, the transmitter being activated by removal of the backing layer to expose the adhesive layer leaving the transmitter operational and ready to adhere to an object.

7. The system of claim 1 wherein each of the transmitters affixed to the object transmits a synchronization code and a tag identification code, the tag identification code being unique to each tag, the synchronization code and the tag identification code being modulated onto a carrier frequency.

8. The system of claim 7 wherein the synchronization code is OEED hex.

9. The system of claim 1 wherein each of the transmitters affixed to the objects transmits respective tag identification codes that are selected for low pairwise cross-correlation values.

10. The system of claim 1 wherein each of the transmitters affixed to the objects transmits respective tag identification codes that are vectors in a binary extended quadratic residue code space.

11. The system of claim 1 wherein each of the transmitters affixed to the objects transmits respective tag identification codes that represent values produced by the code generator polynomial $$\prod_{n \in Q}(x - a^n)$$

where Q={1, 2, 3, 4, 6, 7, 8, 9, 12, 14, 16, 17, 18, 21, 24, 25, 27, 28, 32, 34, 36, 37, 42}.

12. The system of claim 1 wherein the processing system computes respective positions of the transmitters on the object without using any Global Positioning System (GPS) data or inertial sensor data transmitted by the transmitters on the object.

13. The system of claim 1 wherein each of the transmitters transmits signals at a transmission rate that is an integer multiple of 120 transmissions per second.

14. The system of claim 1 wherein each of the transmitters attached to the movable object comprises:
   a backing layer;
   circuitry affixed to the backing layer for generating a radio frequency waveform;
   an antenna for transmitting the waveform;
   an adhesive applied to the backing layer;
   a removable portion applied to the adhesive;
   a sensor for detecting when the removable portion is removed; and
   a transmitter controller for enabling the device to begin transmitting the radio frequency waveform when the sensor detects that the removable portion has been removed;
   wherein when the removable portion is removed the transmitter the transmitter and adhesive layer are left behind such that the transmitter is ready for adhering to an object via the adhesive.

15. The method of claim 14 further comprising using said determined position information to position a computer generated object within a motion picture scene.

16. The method of claim 14 further comprising using said determined position information to position a computer generated object within a video game scene.

17. The method of claim 14 wherein the at least one movable object comprises at least two moving objects within a product manufacturing process, and wherein the method further comprises using said determined position information to analyze interaction between said moving objects within said product manufacturing process.

18. A method of tracking movement of at least one object, the method comprising:
   providing a plurality of radio frequency receivers defining sensors;
   providing a first radio frequency transmitter, the first radio frequency transmitter defining a reference tag;
   providing a plurality of radio frequency transmitters on the at least one object, the transmitters defining marker tags;
   at the sensors, determining relative phase information between the signal received from the reference tag and signals received from the marker tags; and
   processing the relative phase information determined at the sensors to determine respective positions of the marker tags.

19. The method of claim 18 wherein the processing includes:
   computing respective reference tag pseudorange measurements between the reference tags and the sensors;
   computing respective marker tag pseudorange measurements between each of the marker tags and the sensors;
   computing respective single differences between the marker tag pseudorange measurement and the reference tag pseudorange measurement for each of the sensors;
   computing respective double differences between the single differences for pairs of sensors;
   using the double differences to form a set of simultaneous equations; and
   solving the simultaneous equations to compute the position of the marker tag.

20. The method of claim 18 wherein each of the marker tags transmits a synchronization code and a respective tag identification code, the tag identification code being unique to each tag, the synchronization code and the tag identification code being modulated onto a carrier frequency.

21. The method of claim 20 wherein the processing includes determining a code phase indicating the position of a given marker tag to within a range corresponding to a bit position of said synchronization code.

22. The method of claim 18 wherein the processing further includes determining a carrier phase, the carrier phase resolving the position of the given marker tag within said bit position to within less than one wavelength at the carrier frequency.

23. The method of claim 18 further comprising using data produced according to the method to insert computer generated images within a motion picture scene.

24. The method of claim 18 further comprising using data produced according to the method to create a part of a video game scene.

25. The method of claim 18 further comprising using data produced according to the method within a virtual reality simulator.

26. The method of claim 18 further comprising using data produced according to the method for sports training.

27. The method of claim 18 further comprising using data produced according to the method for illustrating athletic action during a broadcast of a sporting event.

28. A method of tracking movement of an object comprising:
placing at least one transmitter on at least one object, the transmitter transmitting a radio frequency signal;
receiving and processing the signal at a plurality of radio frequency receivers;
wherein neither the transmission of the signal nor the processing of the signal at a given receiver is controlled in time with respect to any of the other receivers;
processing phase and pseudorange measurements of the signals received at the receivers to track movement of the object.

29. The method of claim 28 wherein the movement takes place and is effectively tracked within a capture zone having horizontal dimensions of larger than 25 meters by 25 meters.

30. The method of claim 28 wherein the movement takes place and is effectively tracked within a capture zone having a diagonal dimension of at least 100 meters.

31. The method of claim 28 wherein the at least one transmitter comprises at least 1000 transmitters.

32. The method of claim 28 wherein the at least one transmitter comprises a plurality of transmitters that transmit respective waveforms which have been selected to minimize pairwise cross-correlation between transmitters.

33. The method of claim 28 wherein the transmitter transmits at a duty cycle of less than 5 percent.

34. A method of tracking movement of an object comprising:
placing a plurality of radio frequency sensors at not precisely controlled positions about a capture zone;
placing at least one reference radio frequency transmitter defining a reference tag at a not precisely controlled position within the capture zone;
placing a plurality of radio frequency transmitters defining marker tags on the object;
receiving and digitizing at the sensors signals transmitted by the reference tag and the marker tags; and
processing the signals transmitted by the reference tag and the marker tags to determine positions of the object relative to the reference tag as the object moves through the capture zone.

35. The method of claim 34 wherein the marker tags are not synchronized either with respect to each other or with respect to the reference tag, and the receiving steps performed at the sensors are not synchronized with respect to the other sensors.

36. A method of tracking movement of an object comprising:
disposing radio frequency transmitters defining respective marker tags at each of a plurality of separate positions on the object, wherein each transmitter transmits a respective waveform corresponding at least in part to a unique marker tag identification code;
receiving the transmitted waveforms, the received versions of the transmitted waveforms defining received waveforms;
associating the respective received waveforms with the respective marker tags that transmitted those waveforms without demodulating the waveforms to respective bit patterns; and
processing the respective waveforms to determine locations of the respective marker tags.

37. The method of claim 36 wherein the waveform processing includes correlating sampled values of each of the received waveforms against samples of stored tag identification codes waveforms; and
identifying a particular marker tag as the marker tag that transmitted a particular received waveform based on a high correlation between said samples of said particular received waveform and a particular stored waveform.

38. The method of claim 37 wherein the correlating is performed using a digital signal processing microcircuit.

39. The method of claim 37 wherein the stored tag identification code waveforms have been filtered to approximate an idealized tag identification code waveform as it would actually be received at said sensors.

40. A method of tracking movement of an object comprising:
placing a plurality of transmitters on the object, each of the transmitters transmitting signals at a transmission rate that is an integer multiple of 120 transmissions per second; and
processing the transmitted signals to track movement of the object.

41. The method of claim 40 wherein the transmission rate is 240 transmissions per second.

42. A method comprising:
providing at least three wireless transmitters affixed to a camera to define camera transmitters;
providing at least four wireless radio frequency receivers for receiving signals transmitted by the camera transmitters; and
processing phase information extracted from signals received from the camera transmitters to the at least four wireless radio frequency receivers to determine movement of the camera.

43. The method of claim 42 wherein the method does not involve using any electromechanical or optical sensors to determine the movement of the camera.

44. The method of claim 42 further comprising correlating the movement of the camera with computer generation of an image onto a scene recorded by the camera.

45. The method of claim 42 further comprising:
providing at least one wireless transmitter defining a reference transmitter at a stationary position; and
wherein the processing step comprises processing signals received from the camera transmitters and from the reference transmitter to determine movement of the camera.

46. The method of claim 42 wherein the transmitters are radio frequency transmitters.

47. The method of claim 42 wherein the camera is a hand held motion picture camera.

48. The method of claim 47 further comprising:
processing an image recorded by the hand held camera and signals received from the transmitters on the camera to remove camera jitter from the recorded image.

49. A system for recording a motion picture image for later processing comprising:
a movable motion picture camera;
a plurality of radio frequency transmitters affixed to the camera;
a reference transmitter not affixed to the camera;

at least four radio frequency receivers positioned about the camera; and a first processing section for receiving signals transmitted by the transmitters and determining phase difference information relative to the respective transmitted signals as received at the receivers, and for determining from the phase difference information the movement of the camera.

50. The system of claim 49 further comprising:

a second processing section for altering the recorded motion picture image based on said movement of the camera.

51. The system of 50 wherein the transmitters affixed to the camera do not transmit any inertial sensor data.

52. The system of claim 50 wherein the step of altering the recorded image comprises adding at least one computer generated image to the recorded image such that the movement of the camera results in corresponding changes in appearance of the computer generated image.

53. The system of claim 50 wherein the step of altering the recorded imagine comprises removing camera jitter from the recorded image.

54. A motion capture system comprising:

a plurality of wireless transmitters;

a plurality of wireless receivers;

means for determining positions of the wireless transmitters based upon timings of signals received from the transmitters by the receivers without requiring timing clocks of either the transmitters or the receivers to be synchronized.

55. A motion capture system according to claim 54 wherein at least some of the wireless transmitters are located on a movable camera.

56. A motion capture system according to claim 54 wherein:

the wireless transmitters include at least one transmitter disposed at a known location defining a reference transmitter; and the position determining means comprises means for resolving positions of at least 100 transmitters to within 1 cm of accuracy over a capture zone having a diagonal of at least 50 meters.

57. A motion capture system according to claim 56 wherein the resolving means comprises means for resolving positions of at least 1000 transmitters to less than 1 cm of accuracy over a capture zone of at least 75 meters.

58. A motion capture system according to claim 54 wherein the position determining means includes means for mathematically canceling out transmitter clock dependent terms and receiver clock dependent terms thereby obviating a need for synchronization among transmitters and receivers.

59. A motion capture system according to claim 58 wherein:

the receivers comprise at least four receivers defining sensor receivers spaced apart from one another;

the transmitters include at least one transmitter at a known location defining a reference transmitter and a plurality of transmitters defining marker transmitters attached to at least one moving object, the moving object moving within a capture zone within a reception range of the four receivers;

and wherein the means for mathematically canceling clock dependent terms includes:

means for computing respective single difference terms between marker transmitter received signal parameters and reference transmitter received signal parameters; and means for computing respective double differences between said single difference terms for pairs of sensor receivers.

60. The motion capture system according to claim 56 wherein the marker transmitters transmit spread spectrum signals in bursts of less than 1% duty cycle.

61. The motion capture system according to claim 56 wherein the marker transmitters comprise a plurality of groups of marker transmitters, a first group of marker transmitters transmitting spread spectrum signals within a first frequency band, a second group of marker transmitters transmitting spread spectrum signals within a second frequency band, the first and second frequency bands being separated by a guard band.

* * * * *